(12) United States Patent
Chitra et al.

(10) Patent No.: US 11,301,602 B2
(45) Date of Patent: Apr. 12, 2022

(54) SIMULATION-BASED TESTING OF BLOCKCHAIN AND OTHER DISTRIBUTED LEDGER SYSTEMS

(71) Applicant: Gauntlet Networks, Inc., Brooklyn, NY (US)

(72) Inventors: Tarun Chitra, Brooklyn, NY (US); Rei Chiang, San Francisco, CA (US)

(73) Assignee: Gauntlet Networks, Inc., Brooklyn, NY (US)

( * ) Notice: Subject to any disclaimer, the term of this patent is extended or adjusted under 35 U.S.C. 154(b) by 379 days.

(21) Appl. No.: 16/682,812

(22) Filed: Nov. 13, 2019

(65) Prior Publication Data

US 2020/0167512 A1 May 28, 2020

Related U.S. Application Data

(60) Provisional application No. 62/760,850, filed on Nov. 13, 2018.

(51) Int. Cl.
| | |
|---|---|
| *G06F 30/20* | (2020.01) |
| *G06Q 30/00* | (2012.01) |
| *G06Q 50/06* | (2012.01) |
| *G06Q 40/00* | (2012.01) |
| *G06F 111/08* | (2020.01) |
| *G06F 30/27* | (2020.01) |

(52) U.S. Cl.
CPC ......... *G06F 30/20* (2020.01); *G06Q 30/0185* (2013.01); *G06Q 50/06* (2013.01); *G06F 30/27* (2020.01); *G06F 2111/08* (2020.01); *G06Q 40/10* (2013.01); *G06Q 2230/00* (2013.01)

(58) Field of Classification Search
CPC ...... G06F 30/20; G06F 2111/08; G06F 30/27; G06Q 30/185; G06Q 50/06; G06Q 40/10; G06Q 2230/00
USPC .......................................................... 703/13
See application file for complete search history.

(56) References Cited

U.S. PATENT DOCUMENTS

| | | | | |
|---|---|---|---|---|
| 2014/0337971 | A1* | 11/2014 | Casassa Mont | G06F 21/552 726/22 |
| 2018/0182029 | A1* | 6/2018 | Vinay | G06N 20/00 |
| 2019/0129724 | A1* | 5/2019 | Haun | G06F 9/448 |
| 2020/0133744 | A1* | 4/2020 | MacLeod | G06V 30/1985 |

OTHER PUBLICATIONS

Adelt_2018 (Simulation of the Governance of Complex Systems (SimCo): Basic Concepts and Experiments on Urban Transportation, Mar. 31, 2018) (Year: 2018).*

(Continued)

*Primary Examiner* — Brian S Cook
(74) *Attorney, Agent, or Firm* — Wolf, Greenfield & Sacks, P.C.

(57) ABSTRACT

Some embodiments of the invention provide a framework for simulating the operation of a blockchain system. Simulation may produce quantitative, practical estimates of how varying certain aspects of the system's design affects its performance, cost, and/or other metrics of interest. Some embodiments provide a unified simulation framework which enables designers and operators to use the data produced from one test or model in another, and allowing the system's parameters and/or protocol to be optimized relative to one or more objective functions.

51 Claims, 8 Drawing Sheets

(56) References Cited

OTHER PUBLICATIONS

Rosenthal_2018 (DSHR's Blog, Gini Coefficients of Cryptocurrencies, Oct. 23, 2018) (Year: 2018).*
Calcaterra_2018 (On-chain Governance of Decentralized Autonomous Organization, Blockshain Organization using Semada, May 24, 2018) (Year: 2018).*
Brousmiche_2018 (Blockchain Energy Market Place Evaluation: an Agent-Based Approach, Published in: 2018 IEEE 9th Annual Information Technology, Electronics and Mobile Communication Conference (IEMCON)Yate of Conference: Nov. 1-3, 2018, DOI: 10.1109/IEMCON.2018.8614924) (Year: 2018).*
Bartoletti_2018 (Data Mining for detecting Bitcon Ponzi Schemes, University of Cagliari, Italy Mar. 1, 2018) (Year: 2018).*
Melnyk_2018 (Byazntine Preferential Voting, Mar. 7, 2018). (Year: 2018).*
Angeris et al., An analysis of Uniswap markets. Cryptoeconomic Systems Journal. Nov. 1, 2019:25 pages.
Chitra et al., Agent-based simulations of blockchain protocols illustrated via kadena's chainweb. 2019 IEEE European Symposium on Security and Privacy Workshops (EuroS&PW). Jun. 17, 2019:386-395.
Chitra, Competitive equilibria between staking and on-chain lending. ArXiv preprint arXiv:2001.00919. Nov. 28, 2019;2:1-29.
Kao et al., An analysis of the market risk to participants in the compound protocol. Third International Symposium on Foundations and Applications of Blockchains. May 2020:10 pages.

* cited by examiner

SIMULATION-BASED TESTING OF BLOCKCHAIN AND OTHER DISTRIBUTED LEDGER SYSTEMS

CROSS-REFERENCE TO RELATED APPLICATION

This application claims the benefit, under 37 C.F.R. § 1.78 and 35 U.S.C. § 119(e), of the filing date of commonly assigned U.S. Provisional Patent Application Ser. No. 62/760,850, filed on Nov. 13, 2018, entitled "Simulation-Based Testing Of Distributed Consensus, Sybil Resistance, And Value Distribution In Blockchain And Distributed Ledger Technologies."

BACKGROUND

Blockchain systems are typically complex, decentralized systems which combine aspects of voting, currency, and cryptography. A blockchain is a digital ledger which records transactions so that no record can be retroactively altered (e.g., to add a transaction, or change a state) without altering all subsequent blocks. As such, participants may verify and audit transactions independently and inexpensively, without relying upon a single institution. A blockchain protocol is an algorithm or set of algorithms used by the system to apply transactions to the blockchain, identify users and manage user ownership of assets as a result of transactions, provide a mechanism for achieving user consensus on individual transactions, and manage user-to-user communication, among other functions.

Blockchain systems implementing a blockchain protocol may provide for a cryptocurrency and/or one or more types of smart contracts. A cryptocurrency platform uses blockchain to accomplish value transfer, represented as a ledger of transactions. The ownership of individual cryptocurrency units is established and transferred cryptographically. Smart contract platforms provide a state machine to execute code in a publicly verifiable manner. For example, users Alice and Bob may agree that if the price of stock X is greater than $200 on Dec. 31, 2020, then Alice is to pay Bob $5 on Jan. 1, 2021. If not, Bob is to pay Alice $10 on Jan. 1, 2021. Alice and Bob publish the agreement to the blockchain, and pay the requisite fee to incentivize the network to uphold it. On Dec. 31, 2020, the price of stock X is checked, and system participants reach consensus on whether Alice or Bob is to be paid. Payment between Alice and Bob is then publicly verifiable. A smart contract, unlike a normal contract, does not rely upon the legal system for enforcement if malfeasance occurs. Rather, participants of the platform act not only as users, but also as judiciary (i.e., by voting on the validity of contracts of others). A fundamental premise of blockchain systems is that an effective mechanism should incentivize users to behave honestly, reducing or eliminating the enforcement costs otherwise typically imposed by the legal system.

There are many blockchain systems in use, and new systems are developed over time. Any designer of a blockchain system is typically concerned with proving that the system is safe and resilient to cryptographic attacks, is resistant to financial attacks that lessen performance and concentrate value within a subset of participants, and provides a fair voting mechanism for all participants. Proving that a system has these qualities may involve demonstrating that value stored in the system does not accrete to a small group of individuals, that data and transactions are not withheld from participants, that the system is not prone to performance issues which can slow down the publication of a transaction on the system, and/or encumber the ability of participants from receiving rewards or the right to vote.

SUMMARY

Conventionally, a designer or operator of a blockchain system demonstrates that it has particular qualities via a formal, mathematical proof, under restrictive assumptions, and/or by letting the system run "in the wild" for a period without experiencing substantive attack. These approaches do not allow for precise, quantitative methodologies for measuring how various design decisions affect the system's practical performance.

Some embodiments of the invention provide a framework for simulating the operation of a blockchain system. These embodiments yield quantitative, practical estimates of how varying certain aspects of the system's design affects its performance, cost, and/or other metrics of interest. In this respect, while the inventor has recognized that various conventional tools allow for specialized, one-off simulations, none of these conventional tools provides a unified framework for enabling developers and researchers to use data gleaned from one test or model on one aspect of the system and transfer it seamlessly to another test or model on another aspect of the system. Some embodiments of the invention enable this seamless transfer, thereby allowing the designer and/or operator of a blockchain system to optimize various features and functions. Additionally or alternatively, some embodiments of the invention provide a simulation framework that may be applied to different blockchain systems, enabling consistent application of simulation methodology, and enabling the results generated from testing one system to be compared with results generated from testing other systems.

Some embodiments of the invention are directed to a method for simulating operation of a system implementing a blockchain protocol. The method comprises acts of: (A) executing a unitary set of programmed instructions to simulate a change to a first aspect of the blockchain protocol, by modifying a value for a first parameter relating to the first aspect of the blockchain protocol, so as to produce data representing a state of the system after the simulated change; and (B) executing the unitary set of programmed instructions to simulate a change to a second aspect of the blockchain protocol, by modifying a value for a second parameter relating to the second aspect of the blockchain protocol; wherein the executing in the act (B) comprises using the data produced in the act (A) as input to the unitary set of programmed instructions.

Other embodiments of the invention are directed to at least one computer-readable storage medium having a unitary set of programmed instructions recorded thereon which, when executed, performs a method for simulating operation of a system implementing a blockchain protocol. The method comprises acts of: (A) simulating a change to a first aspect of the blockchain protocol, by modifying a value for a first parameter relating to the first aspect of the blockchain protocol, so as to produce data representing a state of the system after the simulated change; and (B) simulating a change to a second aspect of the blockchain protocol, by modifying a value for a second parameter relating to the second aspect of the blockchain protocol; wherein the executing in the act (B) comprises using the data produced in the act (A) as input to the set of programmed instructions.

Other embodiments of the invention are directed to an apparatus, comprising: at least one computer-readable storage medium, storing a unitary set of instructions for simulating operation of a system implementing a blockchain protocol; and at least one computer processor. The at least one computer processor is programmed via the unitary set of instructions to: simulate a change to a first aspect of the blockchain protocol, by modifying a value for a first parameter relating to the first aspect of the blockchain protocol, so as to produce data representing a state of the system after the simulated change; and simulate a change to a second aspect of the blockchain protocol, by modifying a value for a second parameter relating to the second aspect of the blockchain protocol; wherein the simulation of the change to the second aspect uses as input the data produced as a result of simulating the change to the first aspect.

BRIEF DESCRIPTION OF DRAWINGS

Various aspects and embodiments of the invention are described below with reference to the following drawings. It should be appreciated that the drawings are not necessarily drawn to scale, and that items appearing in multiple drawings are indicated by the same reference number in all the drawings in which they appear. In the drawings.

DETAILED DESCRIPTION

I. Overview

Figure 1:
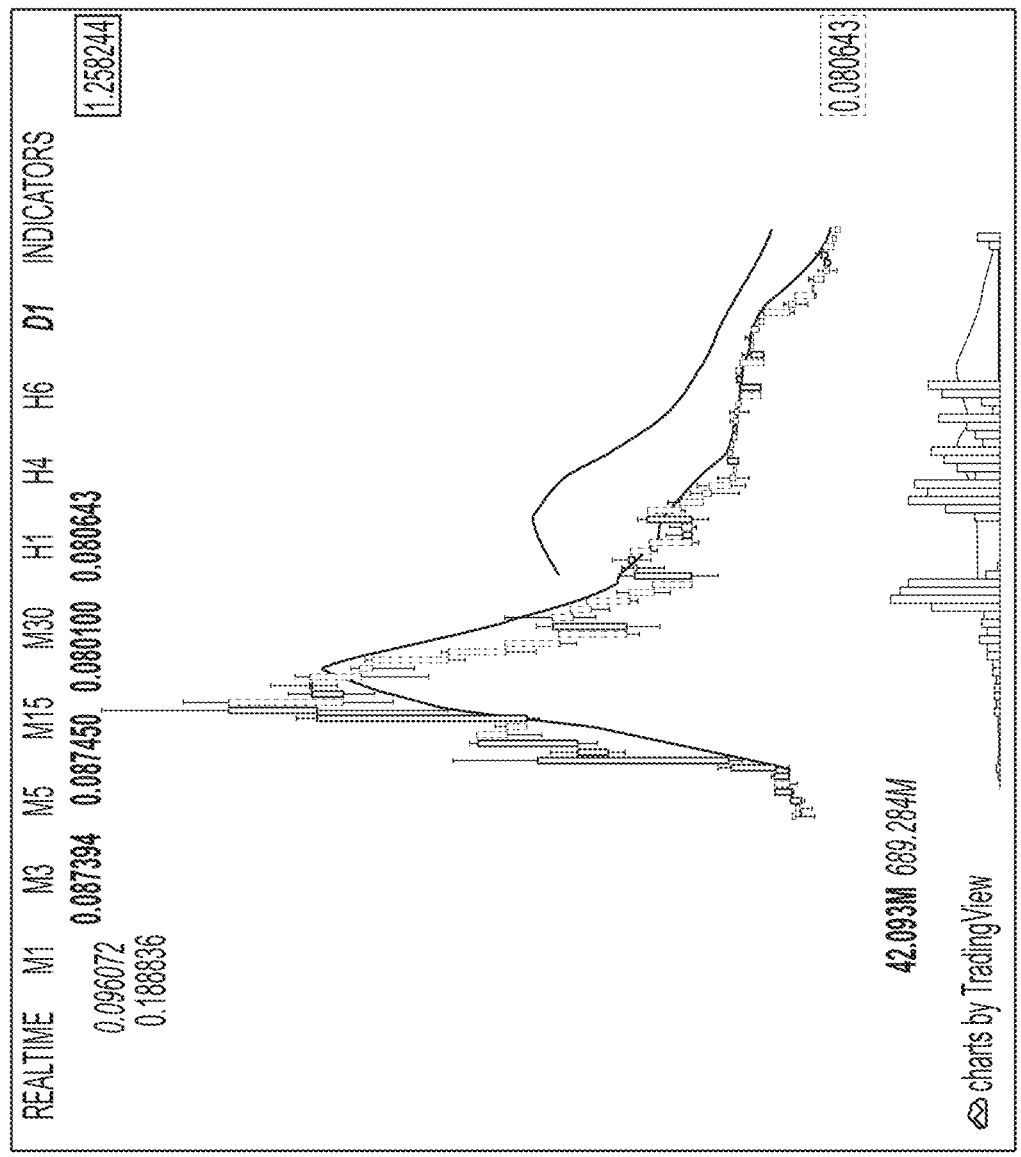
FIG. 1 is a graph of price movement and volume change in the FCoin incident of 2018.

Some embodiments of the invention provide a framework for simulating the operation of a blockchain system. Simulations may yield quantitative, practical estimates of how various aspects of the system's design may affect its performance, cost, and/or other metrics of interest. While conventional systems provide specialized, one-off simulations, some embodiments of the invention provide a unified framework, enabling the data gleaned from one test or model to be transferred seamlessly to another, so that platform operators may optimize various parameters and manage various architectural considerations of a blockchain protocol.

As some aspects of certain conventional non-blockchain arrangements are analogous to features of blockchain systems, the section below describes the use of simulation in these non-block-chain arrangements. The description then continues with a discussion of some embodiments of the invention involving simulation in blockchain systems.

A. Illustrative Non-Blockchain Arrangements

1. Value Transfer

Two taxation schemes used worldwide are recycling taxes and transaction taxes. A recycling tax is imposed on the purchaser of a recyclable item (e.g., a glass bottle or metal can), and the purchaser is later reimbursed when he/she returns the item for recycling. One question typically encountered by legislators when considering the rate or amount of a recycling tax is how to set it high enough that consumers are incentivized to return the item, but not so high that they are unduly dis-incentivized from buying the item.

Establishing a recycling tax may involve setting numerical parameters (e.g., the rate or amount of tax) and making architectural choices (e.g., whether the tax is absolute or relative). While a numerical parameter may be easy to understand in the abstract, predicting whether it promotes the achievement of overarching goals may be more difficult. For example, without knowing the demographics interacting with the system, it may be hard to know whether a tax is too oppressive and causes demand destruction (e.g., people drink fewer sodas as a result of the tax), or if it is too weak and doesn't incentivize a meaningful increase in recycling. In this respect, recycling taxes in US states are typically set at the state level, which can lead to demand destruction in rural areas (where incomes are lower, and drinks are cheaper, so that an absolute amount of tax represents a higher percentage of the price of a drink), but cause a dramatic increase in recycling in cities. From an architectural standpoint, it may not make sense for a recycling tax to be relative (e.g. a percentage of beverage cost), since this will incentivize recyclers to only recycle more expensive drinks instead of increasing the total volume of recycled goods. Also, a large recycling tax, relative to the average value of a drink, might incentivize malicious behavior, such as incentivizing people to break open recycling machines and try to repeatedly collect the tax reimbursement for a single item.

Transaction taxes are imposed by many order book-based marketplaces, such as on equities exchanges (e.g. NYSE, NASDAQ) or futures exchanges (e.g. CME), to dis-incentivize "spoofing" (i.e., creating fake demand by submitting orders, and then cancelling them once others follow) and front-running. In many transaction tax schemes, the amount of tax is tiered based on the volume traded. One question typically encountered by regulators in considering the rate of a transaction tax is how to set the rate high enough to dis-incentivize spoofing and front-running, but not so high as to dramatically affect market liquidity.

Predicting the effect of a transaction tax may be even more difficult than predicting the effect of a recycling tax. For example, the trading activity in different stocks may respond differently to absolute vs. relative taxation, due to considerations such as whether certain stocks issue dividends, and whether alternative ways exist to take on the same risk with equal or better predicted appreciation (e.g. options, derivatives, ADRs, etc.).

Simulation can help the designer of a recycling or transaction tax to construct models of participant demographics (or other categories), model various actions (e.g., avoidance of tax, avoidance of recycling, increased recycling, etc.), and define probabilities for when those and other actions are taken. Simulation may enable a designer to evaluate an objective function (e.g. liquidity, demand destruction, level of recycling achieved, etc.) for various participant categories as a function of various inputs.

Using a recycling tax to illustrate, a simulation may model participants as 'recyclers only when the tax is >x' and choose a distribution over x as our demographic, such as 20% of users who recycle regardless (x=0), 40% who recycle when x>0.01, and the remainder 40% who recycle when x>0.05. A simulation may take input in the form of in historical data on recycling rates and drink demand, and generate an estimate of a future recycling rate for a given demographic. Empirical data on the price distributions of different types of drinks may also be incorporated into the estimates. A simulation may thus predict how a particular tax with certain characteristics may function for different demographics, and use this information to guide policy.

As a transaction tax often implicates dynamic participant demographics, modeling may be more extensive. For example, models may separate market makers from those who are active-only, liquidity-taking participants, or estimate the impact cost of a certain action (e.g., how a trade's size impacts resting liquidity at non-inside price levels). Once the set of participants and their influence on the system are defined, a simulation may predict which parameters (e.g. tick size) and tax architecture (e.g. limit order book or auction) most promote the achievement of a chosen macroscopic objective (e.g., 'the expected slippage cost is x basis points', 'the gini coefficient is between 0.4 and 0.6', or 'the maximum profit that a market maker can make by spoofing is y basis points'), and be used to encode an objective function to optimize chosen outputs.

2. Voting Mechanisms

Simulation may be used, for example, to estimate voter eligibility and selection in voting systems. In this respect, many jurisdictions choose parameters for deciding which citizens are eligible to vote. For example, some jurisdictions impose registration deadlines and voter-eligibility requirements. The challenge is to establish these parameters so as to maximize participation, while also minimizing voter fraud. Doing so can be difficult. In the US, the balance between federal and state power often varies by district.

As a result, simulation may be helpful in evaluating districting decisions. District boundaries may be optimized based on isoperimetry and demographic densities, so as to minimize gerrymandering. Computing a practical district boundary may also involve considerations such as geopolitical features.

Designing ranked voting systems, unlike traditional two-party voting systems and run-off elections based multiparty systems, may involve balancing trade-offs between encouraging a concentration of power (e.g. Arrow's Impossibility Theorem) and ensuring a fair vote. The challenge is balancing these trade-offs to produce a practical, easy-to-use, and fair ranked-voting system. In this respect, one challenge may be determining how to construct a distribution of rankings that accurately reflect all pairwise preferences of all voters. This is much harder to do than for a single vote, because for a single vote amongst n candidates, one is estimating the maximal mode for a distribution supported on a set of size n. However, there are n! possible rankings in a ranked voting system, so that a sparse set of rankings often results. Practical systems are guaranteed to have limitations via Arrow's Impossibility Theorem, so the goal is usually to pick the 'least bad' voting system. Simulation allows for stress-testing different ranked voting system methodologies, and may produce estimates of how often a ranked voting system fails. There may be a number of ways to produce desirable results in a ranked voting system, if certain parameters (e.g., the number of characters used in spectral decomposition) are adjusted. Simulation can provide a consistent methodology for comparing the results of different choices and optimizing a ranked voting methodology to the demographics that will employ it.

B. Representative Simulation Uses In Blockchain Systems

Simulation can also be useful in designing and operating aspects of a blockchain system. In this respect, blockchain systems may include mechanisms for incentivizing validators (e.g., miners) and dis-incentivizing bad behavior (which is usually defined in terms of whether or not all of the financial rewards accrue to a small junta).

In the previous section, the example was given of a malicious user within a recycling tax system who tries to redeem an item subject to a recycling tax multiple times. This is analogous to double spending in a blockchain system. Double spending, the most well-known security attack on blockchain systems, involves a single currency unit (e.g., coin) being sent to multiple receivers. This type of attack exploits both a cybersecurity flaw and a financial flaw. The cybersecurity flaw involves the malicious actor being able to add an improper entry to the ledger, and the financial flaw relates to the removal of atomicity of a coin.

A number of parameters of a blockchain system may influence the efficacy and incentives for attacks like double spending. The following is a non-exhaustive list of the parameters which may be calibrated to achieve equilibria in blockchain systems:

Block Reward (and schedule)
Bonding Curve
Slashing Schedules
Bond Yields
Difficulty Adjustment Period
Synchronization of any of these parameters between multiple chains In some embodiments of the invention, values for these and other parameters may be simulated to allow designers and operators to estimate the effect on a blockchain system.

As one example, the choice of block reward may impact blockchain system performance and security. When a blockchain system is near genesis and in its infancy, it may need to reward miners highly to incentivize them to dedicate resources (energy, stake, hard disk space, etc.) to validate transactions and state. However, in a well-established blockchain system having a large population of users, with a block reward that is too large relative to the value of transactions flowing through the system, users may be dis-incentivized to use the system, as their holdings may be frittered away by miners. There have been a number of proposals, from monotonic schedules, such as Bitcoin's totally deflationary reward schedule and inflationary systems (like Ethereum, Tezos, and Cosmos) to systems where users infrequently vote on how the block rewards change. Consequently, these different systems show very different transaction profiles due to their choice of block rewards. The choice of block reward may affect security (incentivizing validators (of which miners are a subset) may ensure there are no fraudulent transactions), stability (providing validators with predictable, fair rewards in exchange for their resources), and performance of the asset (so that users do not feel taken advantage of by the validators).

Simulation may also be used to estimate the effect of transaction fees and taxes, to provide confidence that validators are actively competing to validate, process, and potentially finalize transactions, and that transaction censorship is not occurring. In this respect, if there are enough validators, then a user who is not getting his or her transactions reviewed need only increase the transaction fee and/or tax that he/she is willing to pay to get their transactions processed. Transaction fees and taxes can also enable different operations performed on a blockchain system to cost different amounts, reflecting the resources that go into getting validators to achieve consensus for that operation. For example, it may cost more to store data in a blockchain than to perform an operation (e.g. adding two numbers), because validators may have to dedicate additional storage resources for a transaction to be reviewed. Price discrimination, based upon resource consumption, enables validators to focus on certain types of transactions for which they are rewarded more richly. Moreover, transaction fees/taxes can function as 'traffic control' by slowing down the overall transaction rate of the system when validators are overloaded, akin to the packet shaping used in networking equipment. A non-exhaustive list of examples of blockchain-based transaction fees and taxes is:

Distributed Exchanges (e.g. 0x vs. FCoin)
Transaction Fees in currencies such as Bitcoin and ZCash
Gas Fees in Ethereum and other smart contract platforms
Taxes that provide the developers a percentage of return on every transaction to incentivize them to maintain the core clients and software (e.g. ZCash)
Taxes that are used to incentivize good behavior (e.g. Token-Curated Registries)

Some embodiments enable simulation of various transaction fees and taxes, so that designers may be able to achieve a level of confidence that a system will be used, and that validators will be appropriately incentivized to keep the system safe.

Some embodiments may thus enable designers to avoid transaction fee issues, like the issues in the FCoin debacle of 2018. FCoin, an exchange for crypto-assets, gave validators 200% of transaction fees collected by trading (e.g. by issuing new tokens). This incentivized validators to do wash trading—trading with one's self—to increase transaction volume (and thus fees). This led to a dramatic bubble-like effect, where the price of FCoin went up sharply as validators competed to wash trade until it got so competitive that validators went back to simply trying to earn block rewards instead of transaction fee bonuses. The price movement and volume change is illustrated in FIG. 1. On the other hand, traditional equities and futures venues often provide rebates of more than 100%, which leads to dramatic increases in liquidity and price stability (for a small expense to the exchange). These transaction fees, which incentivize market makers to ensure that there is liquidity on lesser traded names, do not end up producing issues like with the FCoin debacle, because regulated venues are incentivized to load balance these rebates, and are not reliant on them to best their competition.

Blockchain systems may also include voting mechanisms analogous to those described above, to validate transactions and state changes, to ensure that a system is fair, secure, and performant. Examples of analogues of ranked voting systems used in blockchain systems include but are not limited to:

Probabilistic Slot Protocols in DFINITY and Stellar
Splitting block rewards over forks
Ranking Token Curated Registries/determining conversion rate
Verifiable Random Functions for leader elections and committee selection (Algorand, DFINITY, Ethereum's Casper, . . . )
Verifiable Delay Functions for ensuring fairness (e.g. Chia, Spacemesh)
Sampling-based consensus (e.g. Avalanche, Stellar)

In these systems, a fair ranked vote provides a mechanism for performing a fair lottery for deciding which user(s) receive(s) a block reward, with a probability weighted by the resources which they have provably committed to the network. As such, these mechanisms may be helpful for ensuring fairness, such as in situations where the resource that is being deployed is purely digital (e.g. a stake in a digital asset). Probabilistic slot protocols and block reward splitting schemes (e.g. FruitChains, GHOST, Inclusive Protocol) may provide a mechanism for fairly deciding how to split a block reward based on a first come, first reward basis. Ranked votes may also ensure that a single malicious actor would have to change more than a single transaction and/or block to perform a censorship attack. This is because it is harder to skew the distribution over possible rankings than single-candidate/single-validator election environment. Additionally, ranked voting can enable fewer resources to be used (e.g. Verifiable Random Functions in PoS).

Simulation may also be used in designing a secure and efficient blockchain system to ensure that participants are eligible to use resources to earn a reward. In protocols which employ methodologies for sharding transactions—i.e., dividing a set of transactions into chunks so that only a subset of validators actually looks at these transactions—it may be important to determine whether a validator is eligible for a certain shard or not. This may ensure that resources are not wasted (e.g. by allowing validators to only validate the transactions which the network needs them to validate, instead of all transactions, as in Bitcoin and Ethereum) and that validators are not able to claim rewards for multiple shards even though they only validated transactions on one shard. Moreover, regulatory concerns—e.g. Know Your Customer laws (KYC) for asset-backed stablecoins that are held as centralized token exchanges such as Coinbase and Gemini—may result in eligibility requirements imposed on a blockchain system by conventional legal structures.

The foregoing examples illustrate that simulation may be used in accordance with some embodiments of the invention to tune values for selected numerical parameters, and make choices regarding architectural considerations, to design a safe, performant, and fair blockchain system. Some embodiments enable simulation to provide a methodology for testing how changes affect a product before it is built, thus saving developers countless hours (i.e., due to the speed and efficiency of simulation) and conserving resources.

Figure 2:
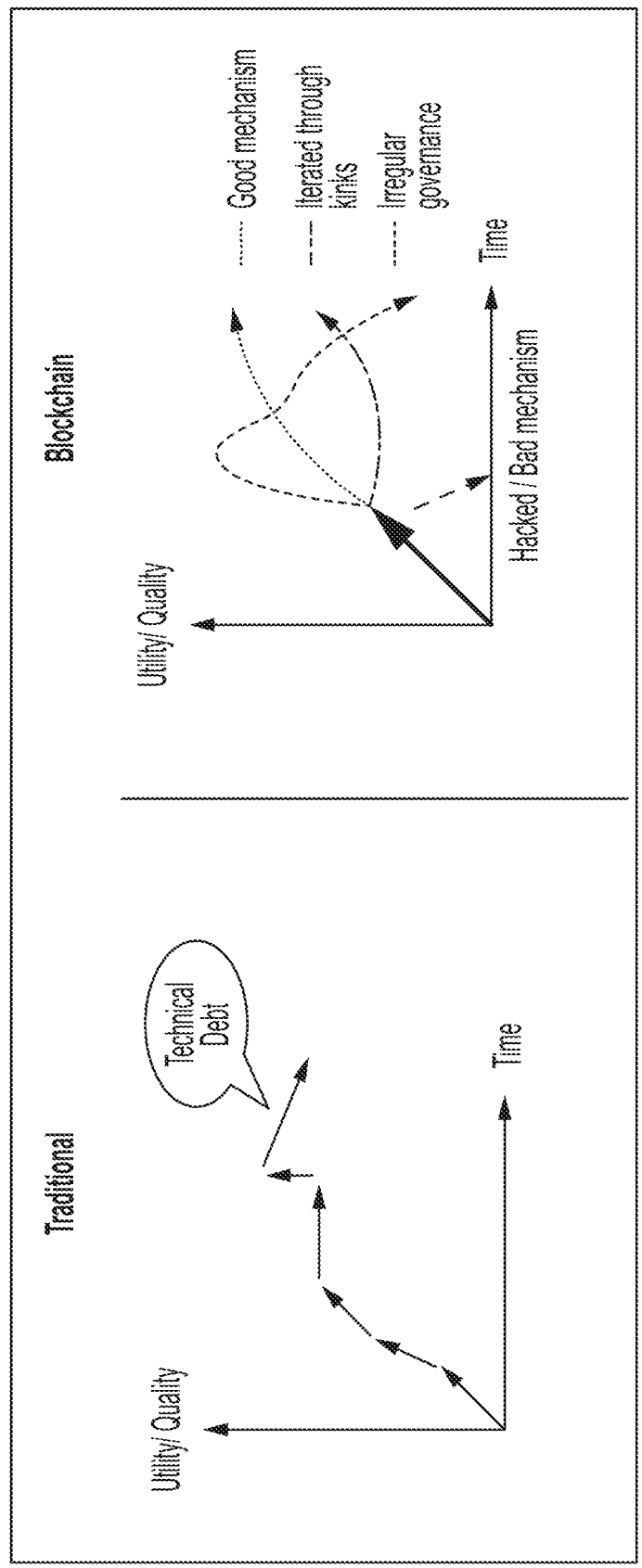
FIG. 2 symbolically depicts a comparison between changes in utility and quality over time in traditional software development endeavors, and changes in utility and quality over time in blockchain software development endeavors.

In some embodiments of the invention, simulation may be used post-launch by the operator of a blockchain system. In this respect, the Assignee has recognized that blockchain systems may have much more tenuous initial conditions than traditional software. Early in the lifecycle of a body of software, a developer may release an incomplete version of the final product, and update it easily (e.g. 'Move fast and break things'). In a blockchain system, however, it may be exceedingly difficult to iterate after launch without explicitly incorporating an upgrade mechanism into a protocol or contract. Even if an upgrade mechanism is incorporated, getting all stakeholders (e.g., users, validators, etc.) to agree on a revision can be problematic. To gain consensus, the proposer of an update may need to provide evidence to stakeholders that the proposed change will not damage the system's security, efficiency, or fairness, and will provide the benefit that is claimed. FIG. 2 illustrates a comparison between traditional software development and blockchain software development. Specifically, in FIG. 2, it can be seen that in traditional software development, improvements to utility and/or quality are achieved almost immediately with any software upgrade. In blockchain systems, by contrast, the effect of economic incentives and trading taxes may be unclear, making it difficult to determine whether improvements are monotonically increasing.

Some embodiments of the invention enable simulation to estimate the effect of changes to various security, efficiency, and fairness measures (e.g., the gini coefficient, throughout, expected resource usage, etc.). Simulation may thus produce strong evidence that an operator may use to demonstrate to participants that a particular upgrade is desirable, making it more likely that the upgrade will be passed. Moreover, simulation may enable the operator to achieve consensus quickly and efficiently—much more efficiently than on a testnet, and with far more realistic stress tests than might be performed on a testnet.

Some embodiments of the invention allow for ongoing system monitoring and adjustment to improve efficacy, and to estimate how a system will respond to an adjustment. As an example, ongoing monitoring may help stakeholders decide whether to contribute resources to a network. In this respect, the ability to make accurate predictions about various roles available in a blockchain system, and the corresponding costs and benefits of each, may help users and validators, particularly during periods of stress. To illustrate, Ethereum gas costs went up 100×-1000× during the Cryptokitties meltdown of December 2017. The ability to predict that this would happen could have helped a user decide whether or not to run a smart contract on the network, and/or at a particular time, or select another network on which to execute a particular contract, in an analysis akin to credit scoring. Simulation of various consensus algorithms in a fair, neutral, third-party, and comparable manner may allow users to compare networks, and determine whether a network they are using has gotten better/worse over time. Simulation may enable validators to determine whether there is enough reward in the long run to offset upfront costs. Since these "credit scores" are based on rare events, it is nearly impossible to conduct them using test networks. The only way to accurately and fairly generate one is by considering many different unlikely events, and demonstrating that certain metrics related to security, performance, and fairness are not appreciably altered under duress.

In some embodiments of the invention, ongoing monitoring may allow simulations to be calibrated, to may improve how well they replicate reality, and to provide a baseline set of expectations for stakeholders of a system, so that users and validators know what to expect.

II. Simulations in Blockchain Systems in Accordance with Some Embodiments

A. Overview

As used herein, the term blockchain protocol means any algorithm that has the following minimum properties:

Contains, as an internal data structure, an append-only ledger of user value or stake which is replicated on many (if not all) users' machines Uses a value or stake denominated in a discrete, integral unit which corresponds to a coin or token The ledger is made up of atomic units called 'blocks' (Note that in order to include Byzantine Agreement hybrid ledgers (e.g., Algorand), one needs to allow for a broad definition of block; in Paxos and PBFT, we consider each 'view' or 'synod' as a block, and allow for blocks to have variable size)

Provides a mechanism for the participants of the network to reach consensus on whether transactions are allowed and disallowed within the ledger Provides a mechanism for users to join and leave the network as needed (permissioned or permission-less)

Users communicate with each other via a peer-to-peer networking protocol and no single central entity controls the network (as it is dynamic and depends on peers)

Does not require a central entity to manage identity or store the ledger

Provides a randomized reward mechanism (a verifiably random lottery) that controls the creation and destruction of value within the system Provides a publicly verifiable mechanism for value transfer such that user A can transfer value to user B, and other users in the system can validate the transfer Additionally, blockchain protocols often employ a state machine, such as the Ethereum virtual machine or the Cosmos state machine, that provides a conversion from coins to a set of actions that change the global state of the system. For example, in the Ethereum virtual machine, the ledger's value entity is the token Ether, while the state machine consumes Ether and perform certain actions. These actions are akin to the instructions that a CPU runs. Example actions for an illustrative set of instructions follows:

1. store(int x) (5 ETH): Stores an integer x in ledger, returns an address to the spot in the ledger that the integer x is stored
2. load(addr a) (1 ETH): Loads an integer that is stored as an address a in the ledger. For Ethereum, a will be in the form of an ECDSA hash.
3. add(int x, int y) (2 ETH): Adds two integers x and y and returns the result.

As such, if the network is to add two numbers x=3, y=4, and let it be publicly verifiable that the two numbers have been added, the following instructions may be used:

addr a1=store(3);
addr a2=store(4);
int z=add(load(a1), load(a2));
addr a3=store(z)

Any participant in the Ethereum network can read addresses a1, a2, a3 and verify that the operation was performed correctly. It can be seen, then, that state machines run alongside the value storage mechanisms within a ledger.

Blockchain protocols also typically provide various security guarantees for ensuring that users participate honestly. As the properties listed above intimate, these may be complex and dynamic objects, and their performance and use depends on the types of users using them, and the network and transaction load at a given moment. Users often demand strong guarantees that a protocol will function as expected when under duress (e.g., as a result of 'black swan' events). In particular, users desire a guarantee that their value and/or stake in the system will be secure and agreed upon by all other participants. Moreover, users expect that transactions submitted when the network is under stress are not censored and/or elided from the ledger. Users also expect a notion of finality—i.e., that once a transaction is accepted, it is final. Broadly speaking, the types of guarantees are:

Large energy/power/resource costs needed to take over a network

Formal mathematical proof that various types of adversarial agents cannot accrete more value from a blockchain protocol than they put in, in expectation Empirical and statistical evidence that different types of agents cannot accrete more value than fairly apportioned to them While the early protocols in this space provided guarantees relating to the first item in the list above (indeed, Bitcoin survived because it wasn't attacked for a sufficiently long time, and grew in number of users so that it became economically infeasible for a single entity to take over the system), later entries to the space (e.g., Algorand, Avalanche, Cardano, DFINITY, Omniledger, Stellar, Tendermint, and Tezos) often provide guarantees relating to the second item. Often, these later guarantees make unrealistic assumptions about network latencies, adversarial adaptability (e.g. how long it takes for an agent to switch/adapt their strategy), and network topology. As a result, blockchain system developers and operators often turn to discrete event simulation to determine whether a protocol will function as expected when under duress. These simulations try to build in as few assumptions as possible about protocol mechanisms, and may run many Monte Carlo simulations to try to estimate statistics about the likelihoods and success rates of different adversarial behaviors. There have been specialized simulations made for individual projects:

DFINITY
Near.ai
Ethereum Sharding Simulations
Avalanche
Ziliqa
PBFT

In contrast to these discrete event simulations, some embodiments of the invention provide a simulation framework which makes it possible to directly compare statistical outputs of different protocols. This framework may, for example, allow a blockchain system developer or operator to run main event loops with different assumptions, as opposed to strong assumptions that admit proof.

In some embodiments, simulation may provide a mechanism for tuning parameters of a blockchain protocol. Within blockchain protocols, there are often reward/slashing parameters that can determine whether the system is stable or not. Choosing values for these parameters is difficult, and conventionally is done in ad hoc fashion. By drawing from analogies for how trading parameters are set in algorithmic trading, some embodiments of the invention use simulation to help predict how blockchain protocols will perform under different user assumptions, and use this to guide the choice of parameters. In particular, given a set of models for users/agents for a blockchain, some embodiments may construct a macroeconomic fitness function for a blockchain protocol (such as a throughput [tx/sec], a gini coefficient, or some other function that averages values over the whole network of participants) and optimize this function (using simulation as a way to generate a function evaluation).

Some embodiments of the invention provide a generic agent-based framework for simulating blockchains protocols, smart contracts, and distributed consensus. This generic simulation helps users in a variety of ways. For example, some embodiments of the invention provide for stress tests, such as to simulate attacks which have occurred in the wild against a protocol. This may enable a developer to determine if a design or contract under development is vulnerable to any known attack. These attacks may be security attacks (e.g. attacks that cause the protocol/contract to malfunction) or financial attacks (e.g. attacks that send all value to a single individual or small junta of individuals). It should be appreciated that, conventionally, there is no standardized, generic framework for performing stress tests in a manner which is auditable by a third-party.

Note that it is important that a protocol is generic so that one can test out attacks that affect one blockchain on another blockchain. If there weren't genericity, then it would be impossible to transfer an attack from one chain to another. If we observed a double spending attack on Bitcoin, some embodiments may enable a transfer of the exact same attack to Ethereum. Some embodiments may also test for network-level attacks, such as eclipse attacks, which aim to separate certain users from the rest of the network in an effort to censor them.

Some embodiments enable a user to stress test a protocol or contract thousands to millions of times faster than it would take on a test network or a live network, thereby allowing for significantly reduced development time. In some embodiments, increased simulation speed is realized by partitioning a blockchain protocol into pieces that can be sampled in probabilistic manner, via a method such as Markov Chain Monte Carlo, and pieces that are deterministically executed. For instance, instead of exactly specifying network latencies for every link in a blockchain network, some embodiments may sample from a distribution of observed latencies, which may provide an increase in speed, as we only have to specify the distribution at genesis, and sampling is typically a computationally inexpensive operation. Moreover, some embodiments may model the deterministic functionality via simplified models with the same statistical properties as a real blockchain protocol. The combination of these two techniques can, in some embodiments, yield multiple order of increases in speed, as depicted below in the example section.

Some embodiments of the invention may provide for fair comparisons. In this respect, conventionally, it is impossible to audit or compare claims made by designers and operators of various protocols and contracts. For example, the designer of a protocol might claim that the protocol supports 1,000,000 transactions per second, and the designer of another protocol might claim that it supports 10,000 transactions per second. Some embodiments determine whether these numbers are comparable, and whether the settings under which they were determined are comparable, by providing a generic platform for simulating arbitrary protocols and contracts on these protocols. As such, some embodiments allow for a reliable way to test claims about different contracts.

Some embodiments of the invention may provide for parameter optimization. In this respect, it should be appreciated that as protocols become increasingly complex, they may include an increasingly large number of parameters for which a developer may choose values. It may be difficult to decide a priori and ex vivo the parameter values which work best for a protocol or contract. Some parameters which may need to be tuned include:

Slashing Rate
Block Production Rate
Number of Shards
Time interval for key redistribution Some embodiments support agent-based simulation which allows a developer to simulate how different ratios of participants affect security, performance, and consensus. In this respect, since different protocols or contracts may support different users, some embodiments provide a framework for specifying an expected demographics for a system, and how the demographics interact with the contract or protocol. Further, some embodiments provide for encoding user behavior in an event-based programming language. As a result, a user may run many simulations, and choose optimal parameters relative to some objective function.

The analogue of a bottle recycling tax described above may illustrate a representative objective function that the user of a blockchain protocol may test. In the analogue, the objective function to be tested may be the optimal value of x, representing the number of cents of deposit that is paid by the purchaser of a glass bottle or metal can, and returned to him/her upon redemption. If x=500, then purchasers may be incentivized to 'double-spend' a container at the recycling machine (e.g. by breaking it open and repeatedly scanning the same container). Conversely, if x=0.1, then purchasers may never bother recycling, because the deposit is so low that it provides no incentive. The optimal choice of x may vary based on the people using the system. If all purchasers were 'honest' and recycled containers promptly, one may see no difference in the number of containers recycled, whether x=0.01 or x=0.1. But if there are 50% 'malicious' purchasers who prefer not to recycle, then setting x=25 might be needed to achieve a sufficiently high recycling rate.

In the same way, some embodiments of the invention may enable a designer or operator of a blockchain protocol or contract may choose optimal parameters relative to an objective function, to account for the users of the system who are different levels of 'malicious' and 'honest' (e.g., non-malicious). Since different protocols and contracts may support different users, some embodiments enable a designer or operator to specify the demographics of a population, and how those demographics interact with a contract or protocol.

B. Aspects of a Representative Blockchain Simulation Framework

Some embodiments of the invention may employ a network graph to represent users of a system, network latencies during communication between users, and the types of value, stake, blocks, and/or messages which may be transferred between them. For example, in some embodiments, a network graph may comprise as a one-parameter family of strongly connected graphs $G_t = (V_t, E_t)$, $\forall t \in [0, \infty)$ which is piecewise constant in t. Each vertex v may contain an arbitrary append-only data structure (e.g., representing a user's copy of an instance of a blockchain protocol), and each edge $e \in E_t$ may have an associated vector which represents constraints (e.g. latency, maximum value that can be transferred, etc.).

As an example, assume that there exists a strictly increasing, unique ID stream which labels any added vertex or edge. $V_t$, $E_t$ are totally ordered sets for all t, and that vertices may be directly compared at different times. Graphs $G_s$, $G_t$ are not isomorphic if $G_s$, $G_t$ are not isomorphic as graphs, $v_i \neq w_i$ for $v_0, \ldots, v_0 \in V_s$, $w_0, \ldots, w_m \in V_t$ and $e_i \neq f_i$ for $e_0, \ldots, e_n \in E_s$, $f_0, f_m \in E_t$. If for some $t \in [0, \infty)$ and some $\varepsilon > 0$, we have $G_{t-\varepsilon}$ not isomorphic to $G_{t+\varepsilon}$, then we have either had a graph topology mutation or a change to either a vertex or an edge.

In some embodiments, an agent may represent a stakeholder in a blockchain protocol. This can be a miner, a staker, a user, an SPV node, a forwarding node, a third-party forwarding node (e.g. bloXroute, FALCON), or any node that is running a conforming client and has connected to at least one peer. Agents may be defined by an append-only data structure (e.g., encoded in the node that represents them in the network graph), as well as a set of external inputs I, a state space S, and a discrete action space A. An agent also requires a policy algorithm $\pi: I \times S \to A$ that dictates which action to perform based on input and state.

External inputs may include (but are not restricted to) price feeds from exchanges (e.g. Coinbase, Binance, Bitmex, CME, NYSE), data provided by an oracle contract (such as Oraclize), or data from a government institution (e.g. NIST, NWS, NASA). In some embodiments, external inputs may be empty, if the aim is to model an agent for which actions only depend on endogenous state (e.g. state from running an instance of a blockchain protocol).

The state space may represent an agent's view of the universe, and may be constructed from exogenous, external inputs, endogenous statistics, or any arbitrary (probabilistic) polynomial time computable function of such statistics. For example, an agent's state space might consist of a 10 minute moving average of Bitcoin prices from Coinbase (exogenous), a 10 minute moving average of Bitcoin transaction volume (endogenous), and a ratio of Bitcoin price averaged over exchanges to transaction volume (function of both exogenous and endogenous data). Note that a state space need not be continuous (e.g. real or complex valued) and can be discrete or categorical.

The action space may represent a discrete set of possible interactions which an agent may perform. For example, an action space may include the following actions:

Create Transaction
Verify Transaction
DDoS network (malicious action)
Censor blocks from a specific address (malicious action)
Selfish Mine (malicious action)

In some embodiments, an action space may be neither discrete nor finite, as it may be possible that actions are indexed by an integral parameter (e.g. create transaction of size k coins for $k \in \mathbb{N}$). Additionally, a null action may be represented as $\perp$ and force any action space A to have $\perp \in A$.

In some embodiments, a policy algorithm may be a rules-based or learning algorithm, and may represent how the agent takes in a pair (i, s) $\in I \times S$ and returns an action $\pi(i, s) \in A$ that an agent performs. A policy may be defined as $\pi: I \times S \to P(A)$, where P(A) is the set of probability distributions on A. If a policy is defined in this manner, then a sampling algorithm which describes how to draw a sample from P(A), such as a Markov Chain Monte Carlo (MCMC) algorithm, may be provided. If this is unspecified, some embodiments may assume that an efficient methodology for sampling from P(A) exists. For example, the Alias method may be used. If our input space is Coinbase Bitcoin prices, and state space comprises of 5 and 10 minute moving averages of both Bitcoin prices and transaction volumes, then the following are examples of rules-based and learned policies:

Rules-Based: If the current price is greater than the 5 and 10 minute moving averages and if the 5 minute transaction volume moving average is greater than the 10 minute transaction volume moving average, then DDoS network. Otherwise, perform no action.

Learned: $\pi(i, s)$ is any probabilistic polynomial time computable algorithm that draws an element from A. For instance, $\pi$ could be a linear model, a boosted tree model, or even a neural network that, once composed with a discrete relaxation function (e.g. a sigmoid), yields a categorical action. Concretely, that we have two actions $\alpha_1, \alpha_2 \in A$. Then a simple example of this is: $\pi(i, s) = \alpha_1$ if $i \cdot s > 0$ and $\alpha_2$ otherwise.

Some embodiments may include dynamic policies which adapt over time. In these embodiments, reinforcement learning may allow agents to adapt policies based on how others act.

In some embodiments, given a set of agents $A_1, \ldots A_n$ with policies $\pi_1, \ldots, \pi_k$, where $k \leq n$ (multiple agents can share the same strategy), an atomic policy distribution may be defined to be a multinomial distribution with parameter vector $(p_1, \ldots, p_k)$, $\Sigma_i p_i = 1$, $\forall i, p_i \geq 0$ on the set $\{1, 2, \ldots, k\}$. Formally, if $\Delta^k = \{p \Sigma R_{\geq 0}: \Sigma p_i = 1\}$ is the k-dimensional probability simplex, then an atomic distribution is an element of $\Delta^k$. The parameters $p_i$ may represent a maximum proportion of an overall value of the system that policy $\pi_i$ can expect to achieve, which may be helpful in measuring fairness. In some embodiments, a protocol may be considered $\epsilon$-fair if for any policy $\pi$ with proportion $p$, any participant executing $\pi$ can only reap rewards and/or stake that are within $\epsilon$ of $p$. In some examples, for a selfish mining policy, a user with 33% of a Proof of Work chain's hashpower may control more than 50% of the rewards (and thus, this is at most 0.17-fair). Some protocol security proofs may specify constraints on types of users who may participate within associated protocols. For instance, BFT algorithms may assume that fewer than ⅓ of agents are malicious actors, and Nakamoto algorithms may assume that fewer than ½ of agents are malicious. These constraints may be defined via a policy distribution as any measurable subset $S \subset \Delta^k$.

In some embodiments, a consensus protocol provides an algorithm used to arrive at consensus about a transaction. This algorithm may, for example, be a distributed algorithm which any allowed participant may run individually to determine if a transaction published to the network is valid or not. Examples of distributed consensus algorithms include Byzantine Fault Tolerance, Ben-Or consensus, and Nakamoto consensus. Consensus algorithms may have a variety of state, with a key feature that no one individual has all of the state necessary to make a decision to accept or a reject a transaction. In order to reach consensus, a user of the system (e.g., represented by an agent) may publish a transaction via a peer-to-peer protocol on a network graph. The transaction may be added to a block, or chunk, of transactions which are meant to be validated. Allowed validators work on validating these transactions, and may publish messages declaring whether a set of transactions is valid or not. In some embodiments, not all users must agree on validity. Rather, a protocol's definition of validity may be satisfied.

Consensus protocols may provide finality, in that any user may determine whether or not a particular transaction is valid. Consensus algorithms may provide deterministic finality, in that there may be explicit confirmation that the network has accepted or rejected a transaction. In some embodiments, only probabilistic finality may be provided, in that any individual client may know that a transaction was accepted or rejected up to some probability. For example, in an idealized version of Bitcoin that was presented in the original paper, the probability that a transaction T in block B is finalized as a function of the number of blocks n grown on top of the B is $1 - \Omega(2^{-n})$.

In some embodiments of the invention, agents may transfer messages using a peer-to-peer networking protocol. Such protocols may provide a gossip mechanism implemented via a combination of TCP/IP and occasionally, custom UDP protocols. The protocols may specify a mechanism for a new node ("peer") to join the network ("peer discovery"), update its neighbors, forward messages, and determine how to route a message to another IP address. Peer-to-Peer protocols can also be viewed as dynamic graphs that have certain update rules, forwarding logic, and some model for latencies across this graph. As such, some embodiments model a protocol in this manner.

Some embodiments of the invention may simulate Sybil resistance mechanisms. In this respect, some blockchain protocols provide a Sybil resistance mechanism which corresponds to a methodology, such as Proof of Work or Proof of Stake, to ensure that a validator cannot clone itself and flood the network with copies of itself. These mechanism do this by ensuring that a user commits a certain amount of resources—such as energy, stake, disk space, location, time, etc.—which cannot be easily copied or inflated. Some embodiments of the invention provide a simulation framework which emulates resource consumption (and which may take place much, much more quickly than actually consuming a resource would).

Some embodiments of the invention may include an overall environment which indicates the global state of the system, and choreographs how messages are sent between agents. In some embodiments, an environment may include the following data structures:

Dynamic Collection of Agents: a set of agents, which may change over time. Agents may be represented by a standardized interface (e.g. they may be defined such that their inputs and action space are the same).

Network Graph with Peer-to-Peer Protocol: The peer-to-peer protocol may be a probabilistic process which mutates the network graph at times $t_1, \ldots, t_n$, forcing $$\forall \epsilon > 0, \forall i \in \{1, 2, \ldots, n\}, G_{t_i = \epsilon} \neq G_{t_i + \epsilon}$$

Consensus Protocol: Each agent may be allowed to cause a vote on a transaction, thereby initiating a call to the consensus protocol. The network graph and peer-to-peer protocol may represent how messages are sent within a consensus protocol.

Policy Distribution and Constraints: Representing 'allowable' types of policies in the system, and mapping to an existing k=2 ideas of $\rho$ honest vs. $(1-\rho)$ adversarial.

Probabilistic process for adding agents: Representing how the number of users of a protocol may grow and shrink. In a permissioned setting, this may correspond to how fast the number of allowable voters/validators grows, and in an unpermissioned setting, this may serve as a model for user growth or decay. The process may provide for shock events (e.g. DDoSing, drop out attacks) and need not be 'slowly adapting', as in proofs of consensus in Algorand and DFINITY. In practice, many timing attacks, such as eclipse attacks, rely on being able to shock the system in a way that one needs to accurately represent for security. Since this may not be representable by non-simulation methodologies, some embodiments ensure that these types of attacks can be simulated. This process represents a model of shocks to the user base of a protocol.

Probabilistic process for describing demand distributions: Representing how transactions are generated and how frequently this occurs, to emulate transaction demand (e.g. via a block production rate). Some embodiments may include demand distributions derived from external data (e.g. distributions that reflect how a crash in Bitcoin price affects on-chain transactions).

Clock, Randomness for each agent: A shared state of the clock (with skews, as needed) and randomness (e.g. pseudo-random number generator, used for key generation, simulating a random oracle, transaction generation).

In some embodiments, given single set of initial conditions, a simulation environment may generate transactions, run a consensus protocol, evaluate a Sybil resistance mechanism, allow for an adversarial agent to modify a state of other agents, and emulates TCP/IP and UDP traffic between agents. In some embodiments, an agent may be defined to be adversarial, and may be given special access to modify other people's state from the environment (e.g. someone encouraging bribery).

In contrast with conventional environments used for formal blockchain analysis, which contain subsets of these components connected in a single particular configuration, some embodiments of the invention may enable a user to connect these components together in many different ways, while still enforcing basic algorithmic and physical constraints to achieve distributed consensus. For example, some embodiments may allow for an adversarial agent to use arbitrary data within the environment (including private data of other agents that in practice could only be gleaned by either unauthorized hacking or bribery). However, some embodiments may enforce causality and time-ordering within a simulation, so that (as an example) at a time t an adversary can only use data in the environment that was produced before and up to time t, but no future data.

Some embodiments may enable a user to create a generic environment, for an arbitrary number of agents interacting via network graph that can simulate any consensus mechanism, whether now known or later developed. Sampling trajectories from this simulation may provide a mechanism for evaluating claims about throughput, latency, and/or value accretion in such a way as to allow the user to compare claims from different protocols in a neutral manner.

Additionally or alternatively, some embodiments of the invention may enable a user to design particular aspects of a blockchain protocols, such as by answering questions (e.g., should we use a verifiable random function without causing a decrease in throughput?) and optimizing values for particular parameters (e.g. block production rate, difficulty, slashing, etc.). In some embodiments, a simulation environment may enable full generality, as opposed to conventional environments which can only handle two participants, only allow for certain types of adversarial attacks, cannot replicate results on arbitrary network graphs, and only work for a specific protocol. Some embodiments of the invention may enable a simulation which transfers aspects of one protocol to another, and enables reuse of agents across different protocols.

In some embodiments, in order to replicate Proof of Stake (PoS) protocols, a simulation environment may couple with a local, non-append only structure. For example, some embodiments may handle long-range attacks, which may lead to a non-append-only structures. In some embodiments, these simulations may have their own sources of randomness for evaluating a stochastic process that evolves the stake distribution.

Some embodiments of the invention may include privacy-preserving features. In this respect, the foregoing description of a representative simulation does not include emulating zero-knowledge proofs (non-interactive and interactive), partial and/or full homomorphic encryption, or secure enclaves. However, some embodiments may simulate these via a random oracle. Any tuning of parameters of any of these privacy-preserving components may, for example, be improved through an understanding of how they fit into the environment. For example, a protocol which separates an enclave from the blockchain (e.g., Oasis Labs's Ekiden or Town Crier) may yield improvements to key distribution and/or ameliorate trusted setups, and these entities (and their associated attestations) can provide much better performance than on-chain computations.

Some embodiments of the invention may support side chain protocols. In this respect, the Assignee has recognized that protocols which interact with full consensus protocols but provide much weaker guarantees (e.g., Lightning (built on Bitcoin) and Plasma (built on Ethereum)), may provide the ability to increase throughput via minimizing interactions with the full chain. For example, these protocols may infrequently post state and/or net transactions to their 'host' layer 1 blockchain. As such, some embodiments may allow for modeling how these side chain protocols work and how they interact with their layer 1 blockchains. Additionally, some embodiments may enable the networking and/or routing paths for these protocols to be optimized via simulation. Some may also include virtual and non-virtual state channels within a categorization, as they are off-chain, layer 2 methodologies for generalizing the results of lightning to state machine based systems.

Some embodiments provide alternative consensus methods. In this respect, simulation may cover any type of Sybil resistance and/or consensus mechanism, such as:

Proof of Space (Spacecoin, Sia)
Proof of Space-Time (Chia, Spacemesh)
Proof of Replication (FileCoin)
Proof of Location (FOAM)
Proof of Coverage/Proof of Serialization (Helium)

It should be appreciated from the foregoing description that some embodiments of the invention may appreciably and meaningfully improve the operation of computing systems which employ blockchain protocols. For example, by enabling the designer or operator of a blockchain protocol to simulate security and/or financial attacks on a computing system, some embodiments may enable the designer or operator to identify and address potential system vulnerabilities, enabling him/her to head off an actual attack before it occurs. As another example, by enabling the designer or operator of a blockchain protocol to simulate various parameters and aspects, some embodiments of the invention may enable the designer/operator to encourage any of various user behaviors, including behaviors which affect performance metrics, including system latency.

C. Simulation Examples

Figure 3:
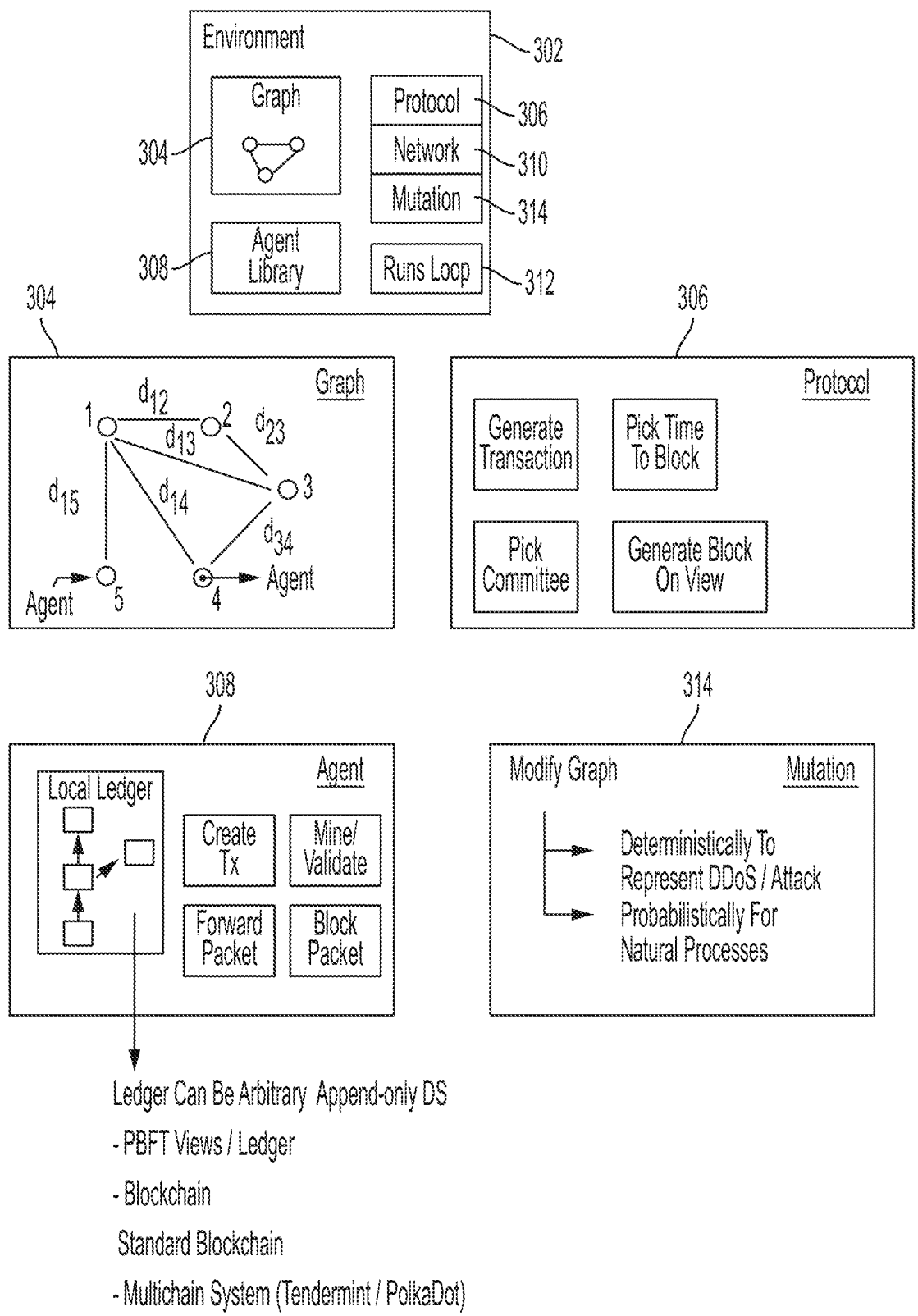
FIG. 3 is a block diagram depicting representative components of a simulation framework implemented in accordance with some embodiments of the invention.

FIG. 3 symbolically depicts various components of a simulation framework implemented in accordance with some embodiments of the invention. Environment 302 includes a network graph 304, protocol specification 306, agent library 308, networking protocol 310, event loop 312 and mutation 314.

The event loop 312 may perform in any of numerous ways. Pseudo-code for, and a logical overview of, an event loop in one example is provided below:

```
setup_genesis_block( )
#   Predicate is a boolean control function that dictates whether we should
#   continue to generate events or if we should stop. It takes in the event
#   counts (e.g. number of blocks produced) and a timer. Examples of valid
#   predicates include "clk.time < 100000 minutes" or "event_ctrs.blocks < 10000 # blocks"
``` while Predicate (Clock clk, EventCtrs event_ctrs):

```
# Note that the Protocol is const as the adversarial agents cannot
# change the protocol, although they are allowed to submit requests to
# the protocol, such as requesting a protocol update
evaluate_adversarial_agents(Graph g, Agents a, const Protocol p)
# The following will generate ledger / transaction event(s). In a
# sharded, multichain protocol, this may correspond to a number of
# events. Each event specifies a set of dependent events and can only
# be executed once all dependencies are satisfied. This will also update
# event counters so that the loop control predicate can increment itself
# as necessary. Note that the protocol is non-const in this context
protocol.generate_next_event(Graph G, Agents a)
# In the next step, agents interact with the events generated by the
  # protocol, update their state, and decide which actions to take (e.g.
# which events to generate).
evaluate_all_agents(Graph G, Agents a, const Protocol p)
# Finally, we consume all events that are allowable and increment the
# Clock and the event counters. Note that the protocol also implicitly
# specifies how the ledger should send block/transactions.
consume_all_allowable_events( )
```

Of course, the preceding example is merely illustrative. In some embodiments, the precise loop specification and ordering may change. For example, in some embodiments there may be a second adversarial evaluation (after evaluate_all_agents) which allows adversaries to react to non-adversarial agent decisions.

As described above and depicted in FIG. 3, in some embodiments, each agent includes its own local copy of a ledger. Any type of ledger that can achieve probabilistic or deterministic consensus may be used. Some example types include PBFT, Paxos, Bitcoin, Sharded PoW, PoS, and delegated versions of these protocols.

In some embodiments, the types of events generated by a simulation may include:

Increment clock

Mutate network graph (to represent permissionless behavior)

Update ledger

Forward ledger update to peer-to-peer neighbor (in generate next event)

Perform action allowed by protocol (this is what agents do)

Perform action disallowed by protocol, but not explicitly prohibited (e.g. not forwarding a ledger update)

In some embodiments, the networking protocol 310 may store the network methods which are allowed within the blockchain system. Examples of network methods include:

ForwardBlock: Forward block to neighboring nodes in the network graph

Figure 4:
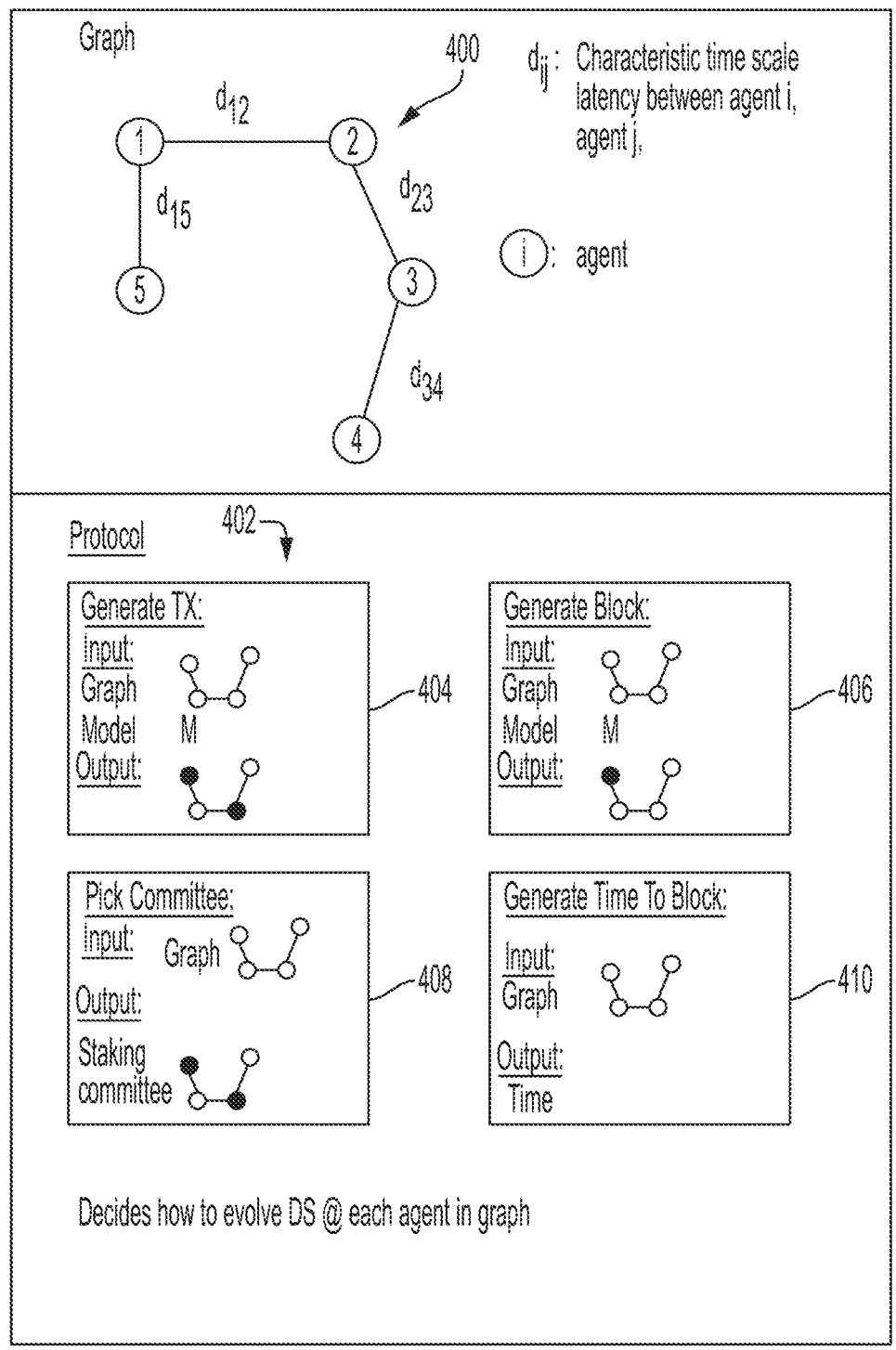
FIG. 4 is a symbolic depiction of a representative networking graph, and representative blockchain protocol data structures, implemented in accordance with some embodiments of the invention.

PingNeighbor: Ping neighbor to see if alive; drop edge from network graph if not DDoSNeighbors: Flood neighbors with non-valid blocks FIG. 4 depicts a networking graph and protocol data structures in more detail. Graph 400 includes agents 1-5, the associated network graph for communication (e.g., $d_{12}$ indicates communication from agent 1 to agent 2), and characteristic latencies or time-scales which constrain how quickly an update is transferred from one agent to the next (i.e., the length of a segment between agents indicating a communication between the agents).

Area 402 depicts an illustrative hypothetical proof of stake protocol. Of course, a protocol specification may vary based upon the type of consensus mechanism being simulated. Some actions which agents can take in the protocol shown at 402 include:

GenerateTx (shown at 404): Generate a transaction that is to be added to the ledger (e.g. adjust the demand profile of the system)

GenerateBlock (shown at 406): Attempt to generate a block that contains zero or more transactions that is valid. If we are in a committee, which is publicly known in most proof of stake protocols, then we produce a block. If not, we produce an invalid block (usually represented by the null symbol, $\perp$).

PickCommittee (shown at 408): A function that is callable by an environment to pick a publicly verifiable committee. If this were a Delegated proof of stake system, such as Cosmos or Tezos, one of a set of delegators may be chosen. If this were a public proof of stake system, such as Algorand or Ethereum's Casper, then a verifiable random function (e.g. a randomness beacon) may be used to draw a committee from all users.

GenerateTimeToBlock (shown at 410): This samples from a statistical distribution (possibly fit to real data from live blockchains) for when the next block should be produced. This method helps advance the clock and keep track of wallclock times.

The protocol depicted at 402 is merely illustrative, but it should be appreciated that a protocol may codify the types of actions which an environment can take, such as PickCommittee, and the actions that any agent may use to interact with others. Overall, a protocol defines how interactions in the system work, and enables users to trust that an observed sequence works as expected.

Figure 5:
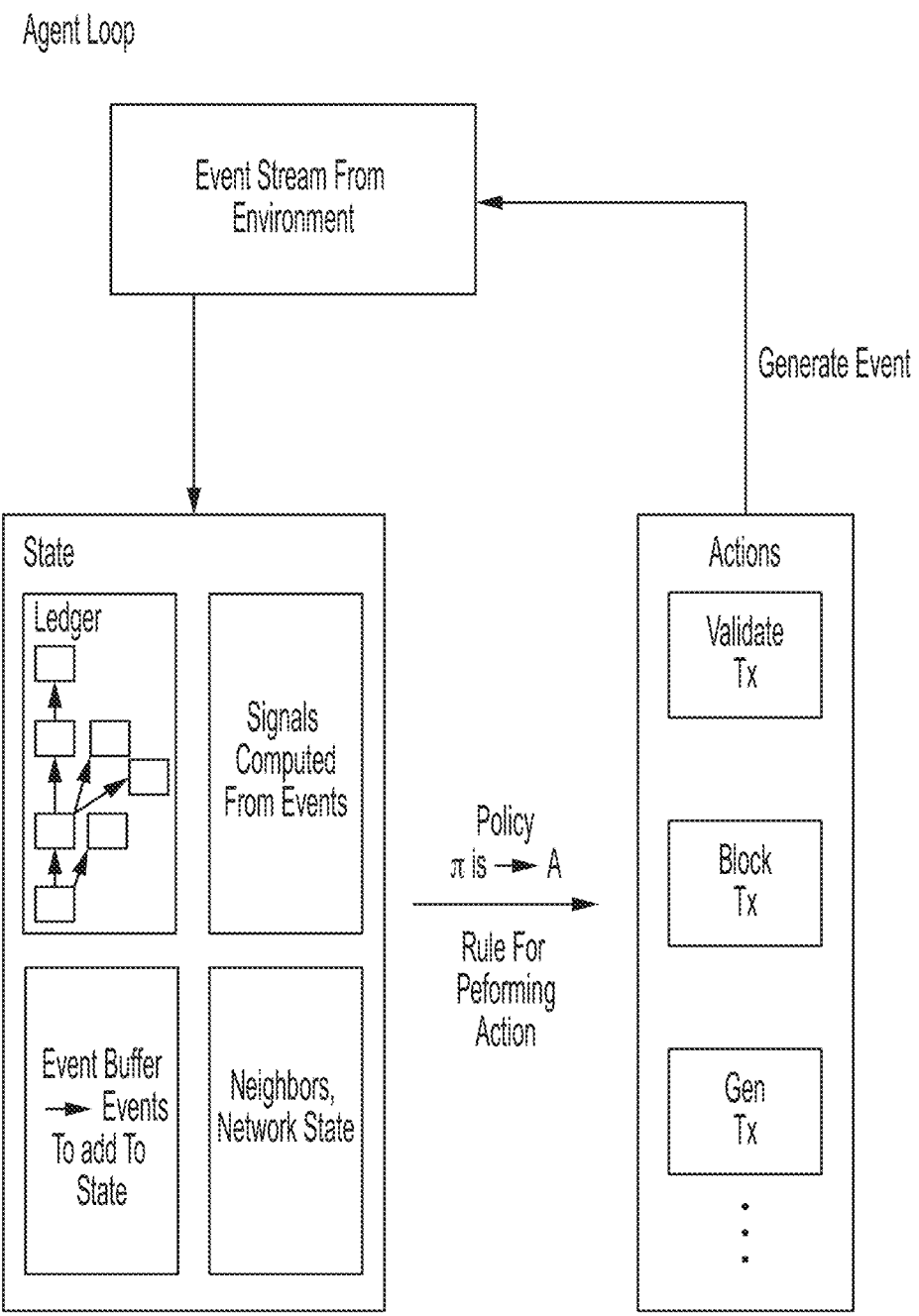
FIG. 5 is a symbolic depiction of a representative action loop performed by an agent, in a system implemented in accordance with some embodiments of the invention.

FIG. 5 depicts a representative agent loop 500. Agent loop 500 includes a sequence of operations performed by each agent in a protocol. At 502, each agent takes in input from the environment, such as an update to a ledger produced by another agent, and then synthesizes the input to produce a local state at 504.

After updating state, each agent evaluates a policy at 506 and decides at 508 whether or not to take an action and if so, what action to take. FIG. 5 depicts a representative set of actions performed by an agent (e.g., defined by a protocol). If action is taken, then the agent generates an event to inform the environment of the action. In some embodiments, the event may be logged by the event loop, and executed when all dependency events have completed.

In some embodiments, events may produce child events (e.g. forward ledger update to neighbor 1 at time $t_1$, neighbor 2 at time $t_2$, etc.) which are performed when dependencies associated with the child events are satisfied.

In some embodiments, the local state produced by a particular agent may be flexible, and determined by a policy applicable to the agent. For example, state may include statistics which are computed and updated, in any suitable fashion (e.g., online), such as moving averages, boolean state triggered by event counters, or state associated with transactions in the ledger (e.g. moving average of the gas cost or op code distributions).

Figure 6:
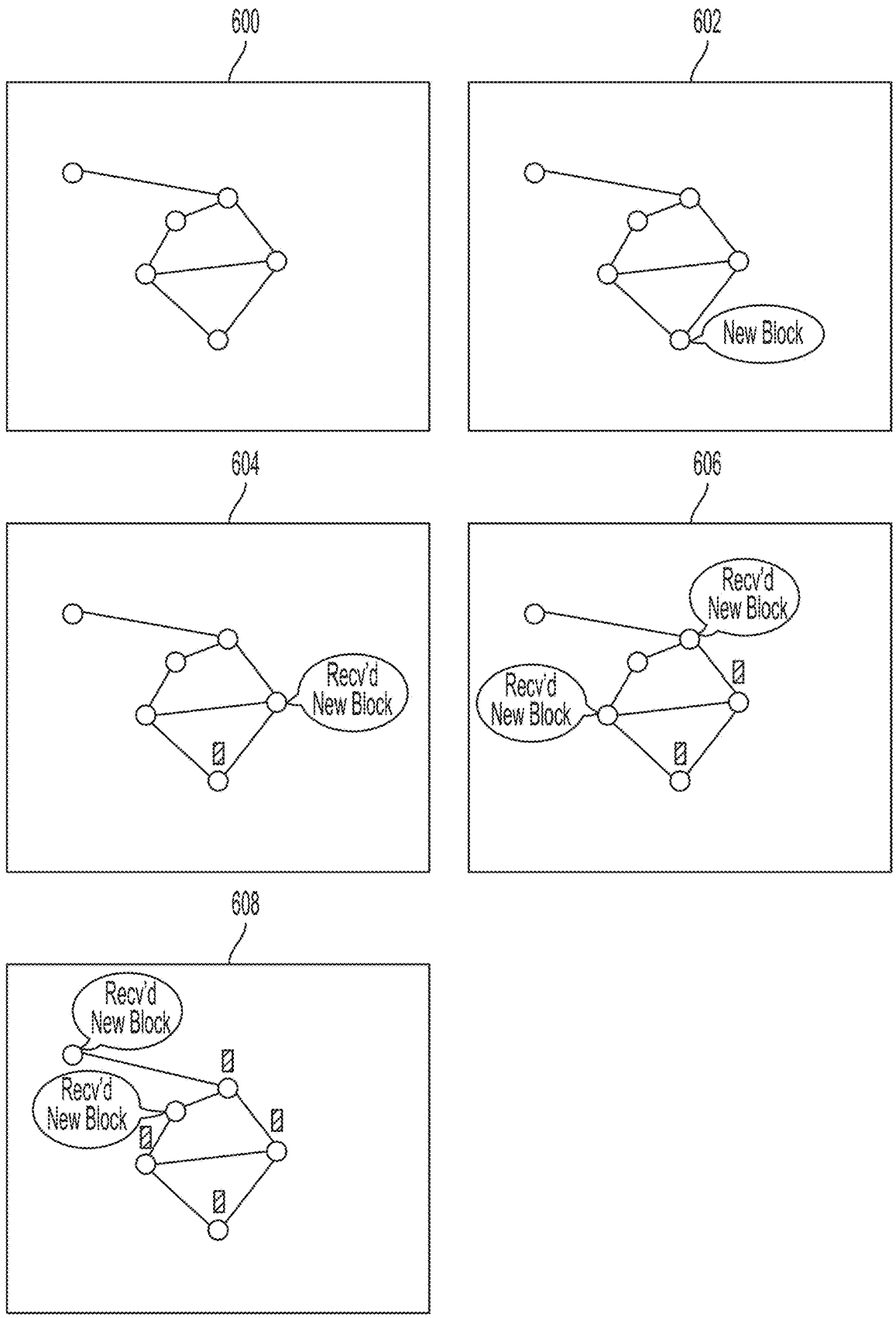
FIG. 6 is a symbolic depiction of blocks of transactions propagating through a network graph, in accordance with some embodiments of the invention.

FIG. 6 depicts a sample user interface representing how blocks of transactions propagate through a network graph. At panel 602, a first agent node announces that it has produced a new block. In panel 604, another agent node announces that it received the block from the first agent node, and forwards it on to others. This process continues in panels 606 and 608 until the block is received by the agent node which is furthest removed on the network from the first agent node. Note that forking, in the traditional Proof of Work context, corresponds to a non-empty overlap in the time intervals [$t_{create}$, $t_{close}$] between two nodes producing blocks, where $t_{create}$ is the time of creation of a block and $t_{close}$ is the time at which the block has reached all nodes in the network.

Figure 7:
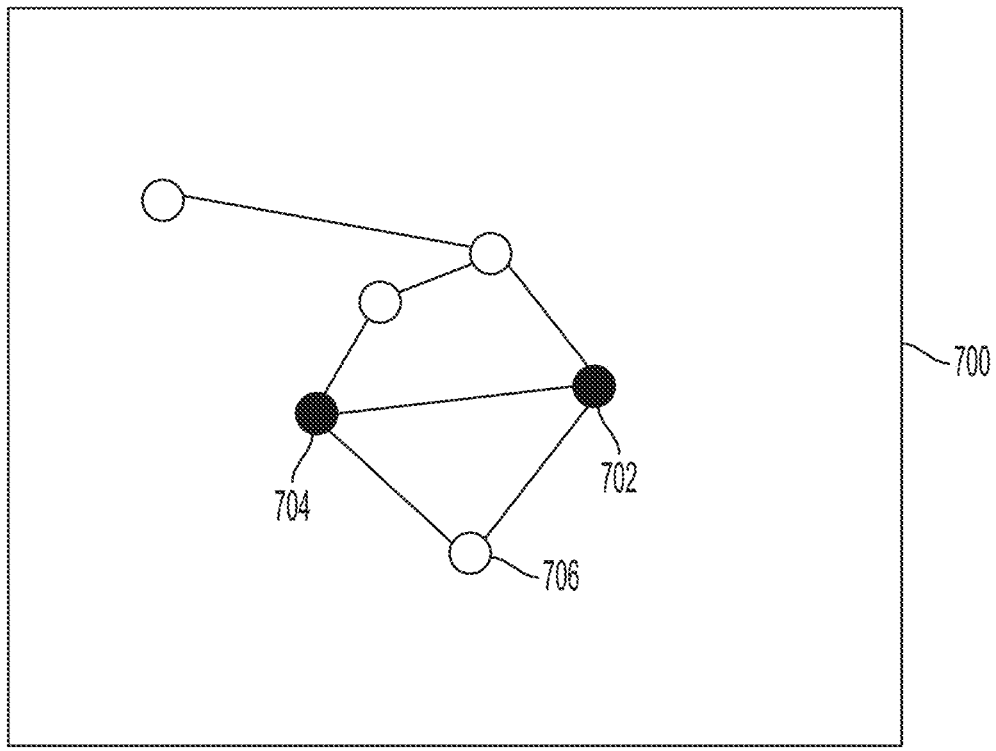
FIG. 7 is a symbolic depiction of a censorship strategy within an event-based simulation, in accordance with some embodiments of the invention.
Figure 7:
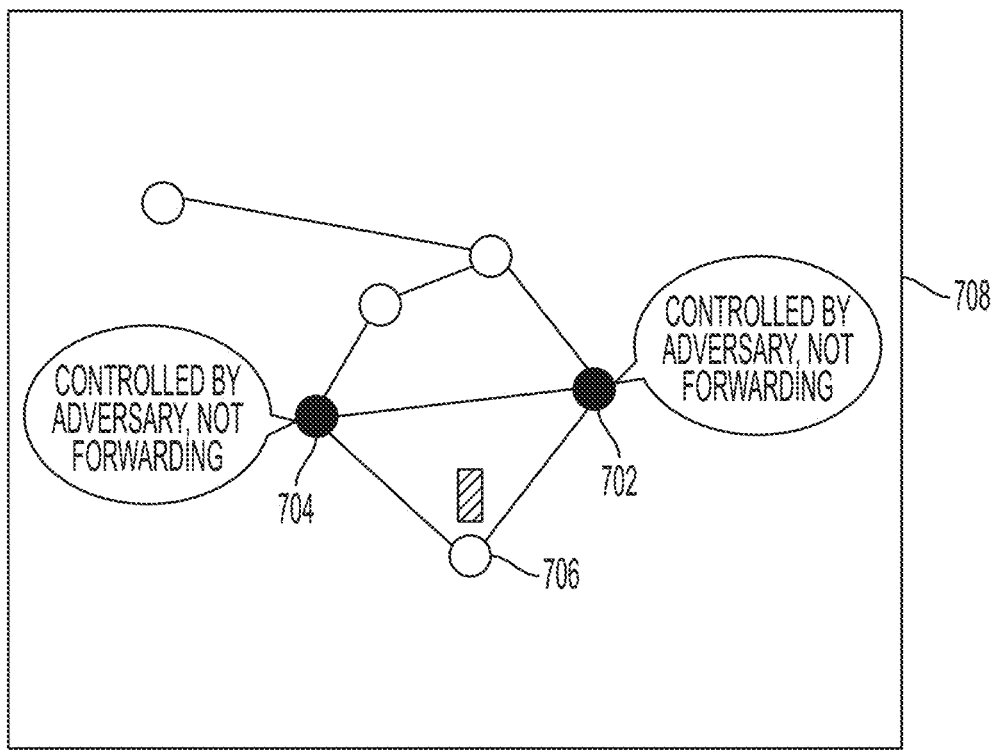

FIG. 7 symbolically depicts a censorship strategy within an event-based simulation. Specifically, in this simulation, panel 700 indicates that agent nodes 702 and 704 aim to block any transactions produced by agent node 706. Panel 708 indicates that this attempt is successful. (In the formalism of the event loop above, nodes 702 and 704 would avoid calling the ForwardBlock method of the networking layer of the protocol they are implementing.) Using the sample user interface shown in FIG. 7, the designer or operator of a blockchain system may put in place measures to prevent a censorship strategy from succeeding, such as by varying certain parameter values, or putting in place any of various architectural measures.

It should be apparent from the foregoing description that some embodiments of the invention may appreciably and meaningfully improve the operation of blockchain systems. For example, some embodiments of the invention may enable the designer or operator of a blockchain system to simulate security and/or financial attacks on a system before it is released, allowing potential vulnerabilities to be identified and addressed, and an attack to be avoided before it occurs. As another example, some embodiments may enable the designer or operator of a blockchain system to determine the effect of varying certain parameter values, allowing the designer or operator to set values which will encourage desirable user behaviors, improve system performance, and decrease latency.

III. Implementation Detail

Figure 8:
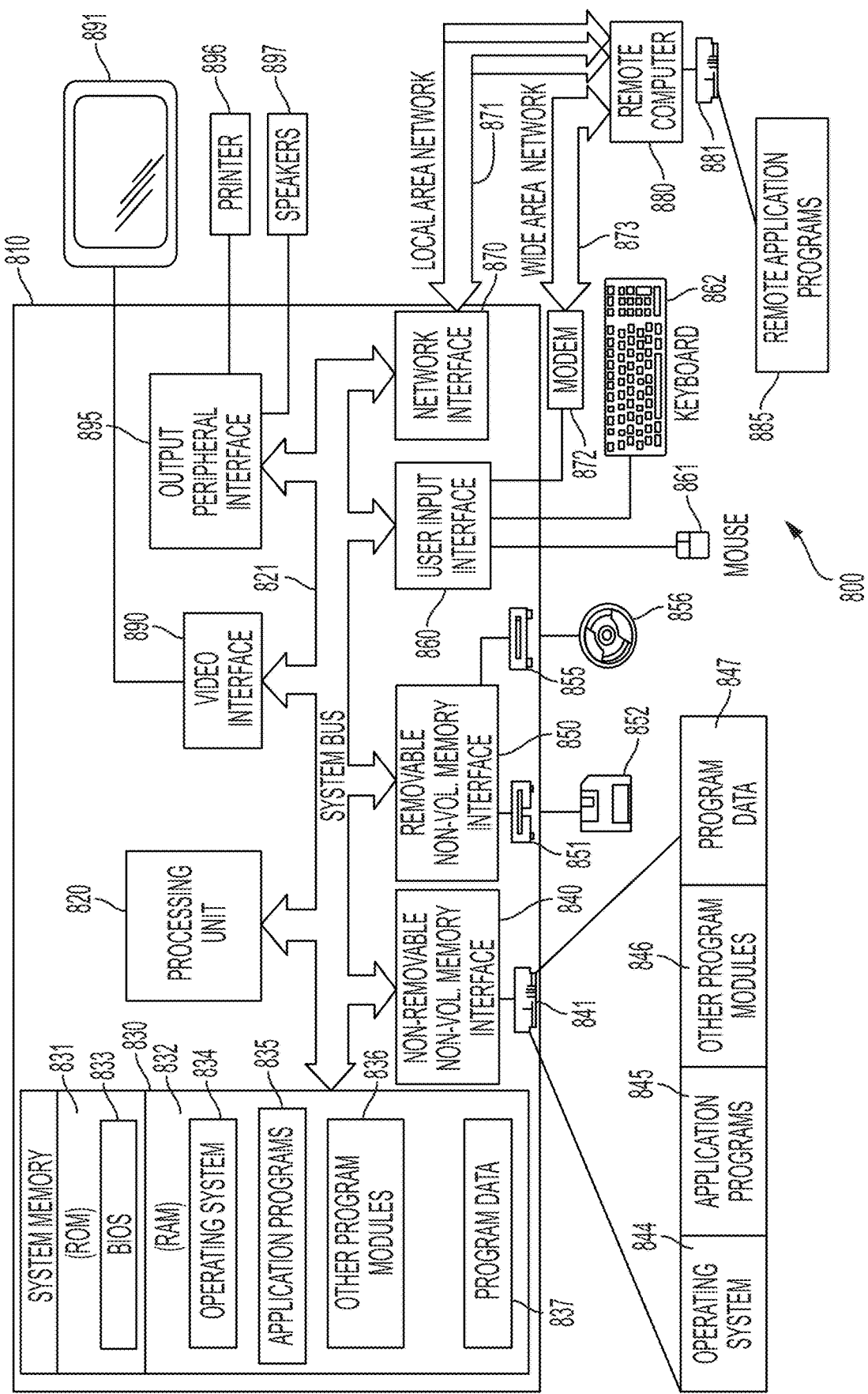
FIG. 8 is a block diagram depicting a representative computing system with which aspects of the invention may be implemented.

It should be apparent from the foregoing that some embodiments of the invention may be implemented using a computing system. FIG. 8 depicts a representative component of a computing system, in the form of a general purpose computing device 810. Computing device 810 may, for example, perform one or more simulations of aspects of a blockchain system, or store instructions for execution by one or more other computing devices in performing simulations of one or more aspects of a blockchain system.

In computer 810, components include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other one or more media which may be used to store the desired information and may be accessed by computer 810. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, the figure below illustrates operating system 834, application programs 835, other program modules 839, and program data 837.

The computer 810 may also include other removable/non-removable, volatile/nonvolatile computer storage media. By way of example only, the figure below illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 859 such as a CD ROM or other optical media. Other removable/non-removable, volatile/nonvolatile computer storage media that can be used in the exemplary computing system include, but are not limited to, magnetic tape cassettes, flash memory cards, digital versatile disks, digital video tape, solid state RAM, solid state ROM, and the like. The hard disk drive 841 is typically connected to the system bus 821 through an non-removable memory interface such as interface 840, and magnetic disk drive 851 and optical disk drive 855 are typically connected to the system bus 821 by a removable memory interface, such as interface 850.

The drives and their associated computer storage media discussed above and illustrated in the figure below provide storage of computer readable instructions, data structures, program modules and other data for the computer 810. In the figure below, for example, hard disk drive 841 is illustrated as storing operating system 844, application programs 845, other program modules 849, and program data 847. Note that these components can either be the same as or different from operating system 834, application programs 835, other program modules 539, and program data 837. Operating system 844, application programs 845, other program modules 849, and program data 847 are given different numbers here to illustrate that, at a minimum, they are different copies. A user may enter commands and information into the computer 810 through input devices such as a keyboard 892 and pointing device 891, commonly referred to as a mouse, trackball or touch pad. Other input devices (not shown) may include a microphone, joystick, game pad, satellite dish, scanner, or the like. These and other input devices are often connected to the processing unit 820 through a user input interface 890 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 899, which may be connected through a output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in the figure below. The logical connections depicted in the figure below include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 890, or other appropriate mechanism. In a networked environment, program modules depicted relative to the computer 810, or portions thereof, may be stored in the remote memory storage device. By way of example, and not limitation, the figure below illustrates remote application programs 885 as residing on memory device 881. It will be appreciated that the network connections shown are exemplary and other means of establishing a communications link between the computers may be used.

Embodiments of the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a tangible machine, mechanism or device from which a computer may read information. Alternatively or additionally, the invention may be embodied as a computer readable medium other than a computer-readable storage medium. Examples of computer readable media which are not computer readable storage media include transitory media, like propagating signals.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing, and it is, therefore, not limited in its application to the details and arrangement of components set forth in the foregoing description or illustrated in the drawings. For example, aspects described in one embodiment may be combined in any manner with aspects described in other embodiments.

The invention may be embodied as a method, of which various examples have been described. The acts performed as part of the method may be ordered in any suitable way. Accordingly, embodiments may be constructed in which acts are performed in an order different than illustrated, which may include different (e.g., more or less) acts than those which are described, and/or which may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for simulating operation of a system implementing a blockchain protocol, the method comprising acts of:
   (A) executing a unitary set of programmed instructions to simulate a change to a first aspect of the blockchain protocol, by modifying a value for a first parameter relating to the first aspect of the blockchain protocol, so as to produce data representing a state of the system after the simulated change; and
   (B) executing the unitary set of programmed instructions to simulate a change to a second aspect of the blockchain protocol, by modifying a value for a second parameter relating to the second aspect of the blockchain protocol;
   wherein the executing in the act (B) comprises using the data produced in the act (A) as input to the simulation of the change to the second aspect of the blockchain protocol;
   wherein the first aspect of the blockchain protocol relates to one of a set of aspects consisting of: a block reward, a transaction fee, a transaction tax, a voting mechanism, eligibility of system participants to earn rewards, a bonding curve, a slashing schedule, a bond yield, and a difficulty adjustment period; and wherein the second aspect of the blockchain protocol relates to another of the set.

2. The method of claim 1, wherein the first aspect relates to a voting mechanism, and the voting mechanism is a ranked voting mechanism.

3. The method of claim 1, further comprising estimating an effect on at least one of a gini coefficient, a throughput measure, and an expected resource usage, as a result of the simulated changes to the first and second aspects of the blockchain protocol.

4. The method of claim 3, further comprising providing data indicative of the estimated effect to at least one user.

5. The method of claim 1, wherein the unitary set of programmed instructions executed in the acts (A) and (B) define an agent-based simulation.

6. A method for simulating operation of a system implementing a blockchain protocol, the method comprising acts of:
(A) executing a unitary set of programmed instructions to simulate a change to a first aspect of the blockchain protocol, by modifying a value for a first parameter relating to the first aspect of the blockchain protocol, so as to produce data representing a state of the system after the simulated change; and
(B) executing the unitary set of programmed instructions to simulate a change to a second aspect of the blockchain protocol, by modifying a value for a second parameter relating to the second aspect of the blockchain protocol;
wherein the executing in the act (B) comprises using the data produced in the act (A) as input to the simulation of the change to the second aspect of the blockchain protocol; and
wherein the first aspect relates to eligibility of system participants to earn rewards, and wherein the value for the first parameter relates to eligibility of system participants to validate particular shards.

7. The method of claim 6, wherein the first aspect relates to a voting mechanism, and the voting mechanism is a ranked voting mechanism.

8. The method of claim 6, further comprising estimating an effect on at least one of a gini coefficient, a throughput measure, and an expected resource usage, as a result of the simulated changes to the first and second aspects of the blockchain protocol.

9. The method of claim 8, further comprising providing data indicative of the estimated effect to at least one user.

10. The method of claim 6, wherein the unitary set of programmed instructions executed in the acts (A) and (B) define an agent-based simulation.

11. A method for simulating operation of a system implementing a blockchain protocol, the method comprising acts of:
(A) executing a unitary set of programmed instructions to simulate a change to a first aspect of the blockchain protocol, by modifying a value for a first parameter relating to the first aspect of the blockchain protocol, so as to produce data representing a state of the system after the simulated change; and
(B) executing the unitary set of programmed instructions to simulate a change to a second aspect of the blockchain protocol, by modifying a value for a second parameter relating to the second aspect of the blockchain protocol;
wherein the executing in the act (B) comprises using the data produced in the act (A) as input to the simulation of the change to the second aspect of the blockchain protocol; and
wherein the act (B) comprises specifying a synchronization between the first and second aspects of the blockchain protocol.

12. The method of claim 11, wherein the first aspect relates to a voting mechanism, and the voting mechanism is a ranked voting mechanism.

13. The method of claim 11, wherein the unitary set of programmed instructions executed in the acts (A) and (B) define an agent-based simulation.

14. A method for simulating operation of a system implementing a blockchain protocol, the method comprising acts of:
(A) executing a unitary set of programmed instructions to simulate a change to a first aspect of the blockchain protocol, by modifying a value for a first parameter relating to the first aspect of the blockchain protocol, so as to produce data representing a state of the system after the simulated change; and
(B) executing the unitary set of programmed instructions to simulate a change to a second aspect of the blockchain protocol, by modifying a value for a second parameter relating to the second aspect of the blockchain protocol;
wherein the executing in the act (B) comprises using the data produced in the act (A) as input to the simulation of the change to the second aspect of the blockchain protocol; and
wherein the method further comprises producing information on a result of the simulated changes, the information comprising at least one of:
an indication of energy, power or resource costs needed to take over the system after the simulated changes;
evidence that system participants cannot accrete more value than contributed after the simulated changes; and
evidence that system participants cannot accrete more value than fairly apportioned after the simulated changes.

15. The method of claim 14, wherein the first aspect relates to a voting mechanism, and the voting mechanism is a ranked voting mechanism.

16. The method of claim 14, further comprising estimating an effect on at least one of a gini coefficient, a throughput measure, and an expected resource usage, as a result of the simulated changes to the first and second aspects of the blockchain protocol.

17. The method of claim 16, further comprising providing data indicative of the estimated effect to at least one user.

18. The method of claim 14, wherein the unitary set of programmed instructions executed in the acts (A) and (B) define an agent-based simulation.

19. A method for simulating operation of a system implementing a blockchain protocol, the method comprising acts of:
(A) executing a unitary set of programmed instructions to simulate a change to a first aspect of the blockchain protocol, by modifying a value for a first parameter relating to the first aspect of the blockchain protocol, so as to produce data representing a state of the system after the simulated change; and
(B) executing the unitary set of programmed instructions to simulate a change to a second aspect of the blockchain protocol, by modifying a value for a second parameter relating to the second aspect of the blockchain protocol;

wherein the executing in the act (B) comprises using the data produced in the act (A) as input to the simulation of the change to the second aspect of the blockchain protocol; and wherein the method further comprises acts of:

(C) executing the unitary set of programmed instructions to simulate a change to an aspect of a second blockchain protocol, so as to produce second data representing a state of the second blockchain protocol after the simulated change; and (D) comparing the data produced in the act (A) with the second data produced in the act (C) for the second blockchain protocol.

20. The method of claim 19, wherein the first aspect relates to a voting mechanism, and the voting mechanism is a ranked voting mechanism.

21. The method of claim 19, further comprising estimating an effect on at least one of a gini coefficient, a throughput measure, and an expected resource usage, as a result of the simulated changes to the first and second aspects of the blockchain protocol.

22. The method of claim 21, further comprising providing data indicative of the estimated effect to at least one user.

23. The method of claim 19, wherein the unitary set of programmed instructions executed in the acts (A) and (B) define an agent-based simulation.

24. A method for simulating operation of a system implementing a blockchain protocol, the method comprising acts of:

(A) executing a unitary set of programmed instructions to simulate a change to a first aspect of the blockchain protocol, by modifying a value for a first parameter relating to the first aspect of the blockchain protocol, so as to produce data representing a state of the system after the simulated change; and (B) executing the unitary set of programmed instructions to simulate a change to a second aspect of the blockchain protocol, by modifying a value for a second parameter relating to the second aspect of the blockchain protocol;

wherein the executing in the act (B) comprises using the data produced in the act (A) as input to the simulation of the change to the second aspect of the blockchain protocol; and wherein the method further comprises an act of optimizing a value for the first parameter relative to an objective function, wherein the first parameter comprises a slashing rate, a block production rate, a number of shards, and a time interval for key redistribution, and the objective function relates to a proportion of malicious and non-malicious participants in the system.

25. The method of claim 24, wherein the first aspect relates to a voting mechanism, and the voting mechanism is a ranked voting mechanism.

26. The method of claim 24, further comprising estimating an effect on at least one of a gini coefficient, a throughput measure, and an expected resource usage, as a result of the simulated changes to the first and second aspects of the blockchain protocol.

27. The method of claim 26, further comprising providing data indicative of the estimated effect to at least one user.

28. A method for simulating operation of a system implementing a blockchain protocol, the method comprising acts of:

(A) executing a unitary set of programmed instructions to simulate a change to a first aspect of the blockchain protocol, by modifying a value for a first parameter relating to the first aspect of the blockchain protocol, so as to produce data representing a state of the system after the simulated change; and (B) executing the unitary set of programmed instructions to simulate a change to a second aspect of the blockchain protocol, by modifying a value for a second parameter relating to the second aspect of the blockchain protocol;

wherein the executing in the act (B) comprises using the data produced in the act (A) as input to the simulation of the change to the second aspect of the blockchain protocol;

wherein the unitary set of programmed instructions executed in the acts (A) and (B) define an agent-based simulation; and wherein the agent-based simulation enables each of a plurality of simulated agents to perform actions consisting of:

creating a transaction;

verifying a transaction;

initiating a distributed denial of service attack;

initiating censorship of one or more blocks from a specific address;

initiating a selfish mine action; and generating a clone of itself.

29. The method of claim 28, wherein the agent-based simulation enables each of a plurality of simulated agents to perform actions defined by a policy, and wherein the policy is rules-based, learned or dynamic.

30. The method of claim 28, wherein the first aspect relates to a voting mechanism, and the voting mechanism is a ranked voting mechanism.

31. The method of claim 28, further comprising estimating an effect on at least one of a gini coefficient, a throughput measure, and an expected resource usage, as a result of the simulated changes to the first and second aspects of the blockchain protocol.

32. The method of claim 31, further comprising providing data indicative of the estimated effect to at least one user.

33. A method for simulating operation of a system implementing a blockchain protocol, the method comprising acts of:

(A) executing a unitary set of programmed instructions to simulate a change to a first aspect of the blockchain protocol, by modifying a value for a first parameter relating to the first aspect of the blockchain protocol, so as to produce data representing a state of the system after the simulated change; and (B) executing the unitary set of programmed instructions to simulate a change to a second aspect of the blockchain protocol, by modifying a value for a second parameter relating to the second aspect of the blockchain protocol;

wherein the executing in the act (B) comprises using the data produced in the act (A) as input to the simulation of the change to the second aspect of the blockchain protocol; and wherein the method further comprises simulating at least one of a security attack and a financial attack on the system.

34. The method of claim 33, wherein the first aspect relates to a voting mechanism, and the voting mechanism is a ranked voting mechanism.

35. The method of claim 33, further comprising estimating an effect on at least one of a gini coefficient, a throughput measure, and an expected resource usage, as a result of the simulated changes to the first and second aspects of the blockchain protocol.

36. The method of claim 35, further comprising providing data indicative of the estimated effect to at least one user.

37. The method of claim 33, wherein the unitary set of programmed instructions executed in the acts (A) and (B) define an agent-based simulation.

38. A method for simulating operation of a system implementing a blockchain protocol, the method comprising acts of:
(A) executing a unitary set of programmed instructions to simulate a change to a first aspect of the blockchain protocol, by modifying a value for a first parameter relating to the first aspect of the blockchain protocol, so as to produce data representing a state of the system after the simulated change; and
(B) executing the unitary set of programmed instructions to simulate a change to a second aspect of the blockchain protocol, by modifying a value for a second parameter relating to the second aspect of the blockchain protocol;
wherein the executing in the act (B) comprises using the data produced in the act (A) as input to the simulation of the change to the second aspect of the blockchain protocol; and
wherein the acts (A) and (B) are performed by a designer of the blockchain protocol.

39. The method of claim 38, wherein the first aspect relates to a voting mechanism, and the voting mechanism is a ranked voting mechanism.

40. The method of claim 38, further comprising estimating an effect on at least one of a gini coefficient, a throughput measure, and an expected resource usage, as a result of the simulated changes to the first and second aspects of the blockchain protocol.

41. The method of claim 40, further comprising providing data indicative of the estimated effect to at least one user.

42. The method of claim 38, wherein the unitary set of programmed instructions executed in the acts (A) and (B) define an agent-based simulation.

43. A method for simulating operation of a system implementing a blockchain protocol, the method comprising acts of:
(A) executing a unitary set of programmed instructions to simulate a change to a first aspect of the blockchain protocol, by modifying a value for a first parameter relating to the first aspect of the blockchain protocol, so as to produce data representing a state of the system after the simulated change; and
(B) executing the unitary set of programmed instructions to simulate a change to a second aspect of the blockchain protocol, by modifying a value for a second parameter relating to the second aspect of the blockchain protocol;
wherein the executing in the act (B) comprises using the data produced in the act (A) as input to the simulation of the change to the second aspect of the blockchain protocol; and
wherein the acts (A) and (B) are performed post-launch of the system by an operator of the system.

44. The method of claim 43, wherein the first aspect relates to a voting mechanism, and the voting mechanism is a ranked voting mechanism.

45. The method of claim 43, further comprising estimating an effect on at least one of a gini coefficient, a throughput measure, and an expected resource usage, as a result of the simulated changes to the first and second aspects of the blockchain protocol.

46. The method of claim 45, further comprising providing data indicative of the estimated effect to at least one user.

47. The method of claim 43, wherein the unitary set of programmed instructions executed in the acts (A) and (B) define an agent-based simulation.

48. At least one computer-readable storage medium having a unitary set of programmed instructions recorded thereon which, when executed, performs a method for simulating operation of a system implementing a blockchain protocol, the method comprising acts of:
(A) simulating a change to a first aspect of the blockchain protocol, by modifying a value for a first parameter relating to the first aspect of the blockchain protocol, so as to produce data representing a state of the system after the simulated change; and
(B) simulating a change to a second aspect of the blockchain protocol, by modifying a value for a second parameter relating to the second aspect of the blockchain protocol;
wherein the executing in the act (B) comprises using the data produced in the act (A) as input to the simulation of the change to the second aspect of the blockchain protocol;
wherein the method further comprises simulating at least one of a security attack and a financial attack on the system.

49. An apparatus, comprising:
at least one computer-readable storage medium, storing a unitary set of instructions for simulating operation of a system implementing a blockchain protocol; and
at least one computer processor, programmed via the unitary set of instructions to:
simulate a change to a first aspect of the blockchain protocol, by modifying a value for a first parameter relating to the first aspect of the blockchain protocol, so as to produce data representing a state of the system after the simulated change; and
simulate a change to a second aspect of the blockchain protocol, by modifying a value for a second parameter relating to the second aspect of the blockchain protocol;
wherein the simulation of the change to the second aspect uses as input the data produced as a result of simulating the change to the first aspect; and
wherein the method further comprises simulating at least one of a security attack and a financial attack on the system.

50. The apparatus of claim 49, wherein the first aspect of the blockchain protocol relates to one of a set of aspects, the set consisting of: a block reward, a transaction fee, a transaction tax, a voting mechanism, eligibility of system participants to earn rewards, a bonding curve, a slashing schedule, a bond yield, and a difficulty adjustment period; and wherein the second aspect of the blockchain protocol relates to another of the set.

51. The apparatus of claim 49, wherein the at least one computer processor is programmed via the unitary set of instructions to estimate an effect on at least one of a gini coefficient, a throughput measure, and an expected resource usage, as a result of the simulated changes to the first and second aspects of the blockchain protocol.

\* \* \* \* \*